(12) United States Patent
Jacobsen et al.

(10) Patent No.: US 9,017,806 B2
(45) Date of Patent: Apr. 28, 2015

(54) HIGH AIRFLOW MICRO-TRUSS STRUCTURAL APPARATUS

(75) Inventors: Alan J. Jacobsen, Woodland Hills, CA (US); William Carter, Calabasas, CA (US); Sha-Chelle Manning, Fairview, TX (US)

(73) Assignee: HRL Laboratories, LLC, Malibu, CA (US)

( * ) Notice: Subject to any disclaimer, the term of this patent is extended or adjusted under 35 U.S.C. 154(b) by 338 days.

(21) Appl. No.: 13/428,348

(22) Filed: Mar. 23, 2012

(65) Prior Publication Data

US 2013/0273347 A1 Oct. 17, 2013

(51) Int. Cl.
*B32B 23/12* (2006.01)
*B32B 3/26* (2006.01)

(52) U.S. Cl.
CPC ........................................ *B32B 3/26* (2013.01)

(58) Field of Classification Search
None
See application file for complete search history.

(56) References Cited

U.S. PATENT DOCUMENTS

| | | |
|---|---|---|
| 4,219,597 A | 8/1980 | Maistre |
| 4,400,421 A | 8/1983 | Stover |
| 4,568,595 A | 2/1986 | Morris |
| 4,575,330 A | 3/1986 | Hull |
| 4,722,089 A | 1/1988 | Botez et al. |
| 5,006,937 A | 4/1991 | Nonoshita et al. |
| 5,185,297 A | 2/1993 | Park et al. |
| 5,265,185 A | 11/1993 | Ashley |
| 5,394,490 A | 2/1995 | Kato et al. |
| 5,401,694 A | 3/1995 | Gesing et al. |
| 5,402,514 A | 3/1995 | Booth et al. |
| 5,932,397 A | 8/1999 | Mustacich |
| 6,176,874 B1 | 1/2001 | Vacanti et al. |
| 6,274,288 B1 | 8/2001 | Kewitsch et al. |
| 6,341,190 B1 | 1/2002 | Summersgill et al. |
| 6,379,962 B1 | 4/2002 | Holy et al. |
| 6,387,593 B1 | 5/2002 | Kewitsch et al. |
| 6,472,210 B1 | 10/2002 | Holy et al. |
| 6,500,401 B2 | 12/2002 | Reznek et al. |
| 6,510,260 B2 | 1/2003 | Chen et al. |
| 6,592,787 B2 | 7/2003 | Pickrell et al. |
| 6,631,231 B2 | 10/2003 | Mizuuchi et al. |
| 6,650,817 B2 | 11/2003 | Murali |
| 6,660,192 B1 | 12/2003 | Kim et al. |

(Continued)

OTHER PUBLICATIONS

International Search Report and Written Opinion for related patent application No. PCT/US2012/030414 dated Jul. 9, 2012, 6 pages.

(Continued)

*Primary Examiner* — Andre Allen
(74) *Attorney, Agent, or Firm* — Christie, Parker & Hale, LLP

(57) ABSTRACT

An apparatus for maintaining an environmental state of a working surface includes: a first micro-truss layer including: a plurality of first struts extending along a first direction; a plurality of second struts extending along a second direction; and a plurality of third struts extending along a third direction, the first, second, and third struts interpenetrating one another at a plurality of nodes, the first, second, and third struts interpenetrating one another at non-perpendicular angles, the apparatus having a contact surface configured to contact the working surface and having an open porosity configured to allow air to flow to the contact surface, wherein a total surface area of the contact surface is between about 1% and about 50% of a total surface area of the working surface.

23 Claims, 21 Drawing Sheets
(6 of 21 Drawing Sheet(s) Filed in Color)

(56) References Cited

U.S. PATENT DOCUMENTS

| | | | |
|---|---|---|---|
| 6,670,039 | B1 | 12/2003 | Nagle et al. |
| 6,684,007 | B2 | 1/2004 | Yoshimura et al. |
| 6,823,116 | B2 | 11/2004 | Inui et al. |
| 6,862,393 | B2 | 3/2005 | Nashimoto |
| 6,870,976 | B2 | 3/2005 | Chen et al. |
| 6,875,442 | B2 | 4/2005 | Holy et al. |
| 6,879,757 | B1 | 4/2005 | Zhou et al. |
| 6,887,809 | B1 | 5/2005 | Adler |
| 6,898,362 | B2 | 5/2005 | Forbes et al. |
| 6,925,233 | B2 | 8/2005 | Inui et al. |
| 6,932,880 | B2 | 8/2005 | Inui et al. |
| 6,941,888 | B2 | 9/2005 | Barsoum |
| 6,952,504 | B2 | 10/2005 | Bi et al. |
| 6,993,235 | B2 | 1/2006 | Takagi et al. |
| 6,993,406 | B1 | 1/2006 | Cesarano, III et al. |
| 7,006,747 | B2 | 2/2006 | Escuti et al. |
| 7,014,661 | B2 | 3/2006 | Blunn et al. |
| 7,020,374 | B2 | 3/2006 | Talin et al. |
| 7,022,522 | B2 | 4/2006 | Guan et al. |
| 7,024,093 | B2 | 4/2006 | Shelnut et al. |
| 7,085,467 | B2 | 8/2006 | Ikemoto et al. |
| 7,209,622 | B2 | 4/2007 | Hoshi et al. |
| 7,382,959 | B1 | 6/2008 | Jacobsen |
| 7,421,159 | B2 | 9/2008 | Yang et al. |
| 7,531,120 | B2 | 5/2009 | Van Rijn et al. |
| 7,609,922 | B2 | 10/2009 | Aoki et al. |
| 7,653,276 | B1 | 1/2010 | Gross et al. |
| 7,653,279 | B1 | 1/2010 | Jacobsen |
| 7,687,132 | B1 | 3/2010 | Gross et al. |
| 7,901,462 | B2 | 3/2011 | Yang et al. |
| 7,938,989 | B1 | 5/2011 | Gross et al. |
| 8,195,023 | B1 | 6/2012 | Jacobsen et al. |
| 8,353,240 | B1 * | 1/2013 | Schaedler et al. ............ 89/36.02 |
| 8,465,825 | B1 | 6/2013 | Cumberland et al. |
| 8,663,539 | B1 * | 3/2014 | Kolodziejska et al. ........ 264/401 |
| 2004/0021237 | A1 | 2/2004 | Shimizu et al. |
| 2004/0145967 | A1 | 7/2004 | Honda |
| 2004/0154252 | A1 | 8/2004 | Sypeck et al. |
| 2004/0200417 | A1 | 10/2004 | Hanawa et al. |
| 2004/0253365 | A1 | 12/2004 | Warren et al. |
| 2004/0264863 | A1 | 12/2004 | Suzuki et al. |
| 2005/0135745 | A1 | 6/2005 | Greiner et al. |
| 2005/0202206 | A1 | 9/2005 | Wadley et al. |
| 2005/0224449 | A1 | 10/2005 | Hsieh et al. |
| 2005/0255289 | A1 | 11/2005 | Wadley |
| 2005/0287696 | A1 | 12/2005 | Dumais et al. |
| 2006/0029348 | A1 | 2/2006 | Kempen et al. |
| 2006/0029349 | A1 | 2/2006 | Hoshi et al. |
| 2006/0080835 | A1 | 4/2006 | Kooistra et al. |
| 2007/0196066 | A1 | 8/2007 | Wang et al. |
| 2007/0247714 | A1 | 10/2007 | Schnieper et al. |
| 2008/0135212 | A1 | 6/2008 | Queheillalt et al. |
| 2010/0236759 | A1 | 9/2010 | Wadley et al. |
| 2010/0300669 | A1 | 12/2010 | Jacobsen et al. |
| 2013/0143060 | A1 * | 6/2013 | Jacobsen et al. .............. 428/594 |
| 2014/0272277 | A1 * | 9/2014 | Schaedler et al. ............ 428/116 |

OTHER PUBLICATIONS

Kewitsch et al., "Nonlinear Optical Properties of Photoresists for Projection Lithography", Applied Physics Letters, Jan. 22, 1996, 455-457, vol. 68 (No. 4), USA.

Shoji et al., "Optically-Induced Growth of Fiber Patterns into a Photopolymerizable Resin", Applied Physics Letters, Aug. 2, 1999, 737-739, vol. 75 (No. 5), USA.

Kagami et al., "Light-Induced Self-Written Three-Dimensional Optical Waveguide", Applied Physics Letters, Aug. 20, 2001, 1079-1081, vol. 79 (No. 8), USA.

Bertsch et al., "Microstereolithography: A Review", Materials Research Society Symposium Proceedings, 2003, 1-13, vol. 758, USA.

Sun et al., "Two-Photon Photo Polymerization and 3D Lithographic Microfabrication", APS, 2004, 169-273, vol. 170, USA.

Chuang et al., "A New Method to Fabricate Polymer Waveguides", Progress in Electromagnetics Research Symposium, Aug. 22-26, 2005, 92-95, Hangzhou, China.

Jang et al., "3D Polymer Microframes That Exploit Length-Scale-Dependent Mechanical Behavior", Advanced Materials, 2006, 2123-2127, vol. 18.

U.S. Patent No. 7,382,959 B1, Issued Jun. 3, 2008, entitled "Optically Oriented Three-Dimensional Polymer Microstructures", Application, Office Actions and Notice of Allowance.

U.S. Patent No. 7,653,276 B1; Issued Jan. 26, 2010; entitled "Composite Structures for Storing Thermal Energy", Application, Office Actions and Notice of Allowance.

U.S. Patent No. 7,687,132 B1, Issued Mar. 30, 2010, entitled "Ceramic Microtruss", Application, Office Actions and Notice of Allowance.

U.S. Patent No. 7,653,279 B1, Issued Jan. 26, 2010, entitled "Optically Oriented Three-Dimensional Polymer Microstructures", Application, Office Actions and Notice of Allowance.

U.S. Patent No. 7,938,989 B1, Issued May 10, 2011, entitled "Composite Structures for Storing Thermal Energy", Application, Office Actions and Notice of Allowance.

U.S. Patent No. 8,197,930, Issued Jun. 12, 2012, entitled "Three-Dimensional Ordered Open-Cellular Structures", Application, Office Actions and Notice of Allowance.

U.S. Appl. No. 13/312,952, filed Dec. 6, 2011, entitled "Net-Shape Structure with Micro-Truss Core," Application (23 pages).

USPTO Notice of Allowance for related U.S. Appl. No. 12/109,262, filed Apr. 24, 2008, dated Dec. 28, 2011, 7 pages.

USPTO Notice of Allowance for related U.S. Appl. No. 12/109,262, filed Apr. 24, 2008, dated Jun. 21, 2012, 11 pages.

USPTO Office Action for related U.S. Appl. No. 12/109,262, filed Apr. 24, dated Jul. 6, 2011, 14 pages.

USPTO Restriction Requirement for related U.S. Appl. No. 12/109,262, filed Apr. 24, 2008, dated Mar. 21, 2011, 6 pages.

PCT Search Report and Written Opinion, dated Mar. 21, 2014, for corresponding PCT Application No. PCT/US2013/048015 (12 pages).

* cited by examiner

HIGH AIRFLOW MICRO-TRUSS STRUCTURAL APPARATUS

BACKGROUND

1. Field

The described technology relates generally to a micro-truss structure and the use of the micro-truss structure in a material or apparatus for controlling the environmental state of a working surface (e.g., a micro-truss perspiration control layer for controlling airflow to a human body).

2. Description of Related Art

A number of approaches currently exist on the market to improve air flow through structures or materials that are expected to have long-duration contact with some portion of a human or animal body, usually constituted from some kind of foam padding. Most often this padding is closed-cell foam. The most relevant of these approaches generally rely on manufacturing air flow pathways into the closed cell foam. Examples include shoe insoles with holes, "egg crate" foam padding, honeycomb materials, formed solid materials or open-cell foams, and thin stretched web-like or loose-weave fabrics.

However, without significantly compromising their stiffness and strength, honeycomb materials generally only allow airflow in a single direction. Commercial examples used in seating and bedding applications include Supracor® fusion bonded honeycomb. However, such "vented" honeycombs generally have a much greater overall weight than non-vented honeycombs in order to make up for the degradation of its mechanical properties.

Solid materials with defined airflow paths have also been used, but are generally uncomfortable. Although airflow is increased in the region of the airflow passages, areas where solid material contacts skin, generally become sweaty and uncomfortable.

In addition, subjecting the above-discussed materials or structures to compressive forces (e.g., when a person is sitting on the material) generally causes densification of the materials or structures (e.g., reduction in the open volume of the material), which can close or reduce the size of airflow paths (or pathways), thereby reducing total airflow through the material.

Thin, stretched web-like, or loose weave fabrics are designed to provide support through tension of the fabric and to provide airflow due to the loose weave. Tension is generally provided by a hard frame around the perimeter of the web or weave. Commercial examples include the Herman Miller® Aeron® Chair, and the Saddleco™ Flow™ bike seat. These approaches do enable increased airflow, but have the disadvantage of being vulnerable to punctures and tears, limiting the overall usefulness in dynamic applications (e.g. sports).

An ordered three-dimensional (3D) microstructure is an ordered 3D structure at the micrometer scale. Currently, polymer cellular materials that are mass produced are created through various foaming processes, which yield random (not ordered) 3D microstructures. Techniques do exist to create polymer materials with ordered 3D microstructures, such as stereolithography techniques; however, these techniques rely on a bottom-up, layer-by-layer approach which prohibits scalability.

A stereolithography technique is a technique that builds a 3D structure in a layer-by-layer process. This process usually involves a platform (substrate) that is lowered into a photo-monomer (photopolymer) bath in discrete steps. At each step, a laser is scanned over the area of the photo-monomer that is to be cured (polymerized) for that particular layer. Once the layer is cured, the platform is lowered by a specific amount (determined by the processing parameters and desired feature/surface resolution) and the process is repeated until the full 3D structure is created. One example of such a stereolithography technique is disclosed in Hull et al., "Apparatus For Production Of Three-Dimensional Objects By Stereolithography," U.S. Pat. No. 4,575,330, filed Aug. 8, 1984, which is incorporated by reference herein in its entirety.

Modifications to the above described stereolithography technique have been developed to improve the resolution with laser optics and special resin formulations, as well as modifications to decrease the fabrication time of the 3D structure by using a dynamic pattern generator to cure an entire layer at once. One example of such a modification is disclosed in Bertsch et al., "Microstereolithography: A Review," Materials Research Society Symposium Proceedings, Vol. 758, 2003, which is incorporated by reference herein in its entirety. A fairly recent advancement to the standard stereolithography technique includes a two-photon polymerization process as disclosed in Sun et al., "Two-Photon Polymerization And 3D Lithographic Microfabrication," APS, Vol. 170, 2004, which is incorporated by reference herein in its entirety. However, this advanced process still relies on a complicated and time consuming layer-by-layer approach.

Previous work has also been done on creating polymer optical waveguides. A polymer optical waveguide can be formed in certain photopolymers that undergo a refractive index change during the polymerization process. If a monomer that is photo-sensitive is exposed to light (typically UV) under the right conditions, the initial area of polymerization, such as a small circular area, will "trap" the light and guide it to the tip of the polymerized region due to this index of refraction change, further advancing that polymerized region. This process will continue, leading to the formation of a waveguide structure with substantially the same cross-sectional dimensions along its entire length. The existing techniques to create polymer optical waveguides have allowed only one or a few waveguides to be formed and these techniques have not been used to create a self-supporting three-dimensional structure by patterning polymer optical waveguides.

Three-dimensional ordered polymer cellular structures have also been created using optical interference pattern techniques, also called holographic lithography; however, structures made using these techniques have an ordered structure at the nanometer scale and the structures are limited to the possible interference patterns, as described in Campbell et al., "Fabrication Of Photonic Crystals For The Visible Spectrum By Holographic Lithography," NATURE, Vol. 404, Mar. 2, 2000, which is incorporated by reference herein in its entirety.

The use of metallic lattice (truss) materials is discussed in U.S. Pat. No. 7,382,959 ("Optically oriented three-dimensional polymer microstructures") and U.S. patent application Ser. No. 11/801,908 filed on May 10, 2007; Ser. No. 12/008,479 filed on Jan. 11, 2008; Ser. No. 12/074,727 filed on Mar. 5, 2008; Ser. No. 12/075,033 filed on Mar. 6, 2008; Ser. No. 12/455,449 filed on Jun. 1, 2009; Ser. No. 12/928,947 filed on Dec. 22, 2010; and Ser. No. 13/437,853 filed on Apr. 2, 2012 which are incorporated by reference herein in their entirety. Various micro-truss structures and methods of manufacturing micro-truss structures are described, for example, in U.S. patent application Ser. No. 12/455,449, which discloses a method of fabricating micro-truss structures having a fixed area, U.S. patent application Ser. No. 12/835,276, which discloses a method of continuously fabricating micro-truss structures according to a continuous process (e.g., a strip of arbitrary length), U.S. patent application Ser. No. 12/928, 947, which discloses a compressible fluid filled micro-truss for energy absorption, and U.S. patent application Ser. No. 12/317,210, filed on Dec. 18, 2008, which discloses a functionally graded three-dimensional ordered open cellular microstructure and a method of making the same, each of which is incorporated by reference herein in its entirety.

SUMMARY

Aspects of embodiments of the present invention are directed to an apparatus for maintaining an environmental state of a working surface. This environmental state can be provided, for example, by providing increased airflow to the working surface in contact with the apparatus. For example, aspects of embodiments of the present invention are directed toward a micro-truss perspiration control layer apparatus for maintaining an environmental state of a surface of a body that generally has restricted air flow. For example, the perspiration control layer includes 1) an ordered open-cellular polymer micro-truss material that is designed to allow in-plane air flow through the perspiration control layer, and 2) a porous contact support area between the article of interest and the relevant region of the body. In one embodiment, the porous contact support area is designed to also provide substantial support to portions of the body.

According to one embodiment of the present invention, an apparatus for maintaining an environmental state of a working surface includes: a first micro-truss layer including: a plurality of first struts extending along a first direction; a plurality of second struts extending along a second direction; and a plurality of third struts extending along a third direction, the first, second, and third struts interpenetrating one another at a plurality of nodes, the first, second, and third struts interpenetrating one another at non-perpendicular angles, the apparatus having a contact surface configured to contact the working surface and having an open porosity configured to allow air to flow to the contact surface, wherein a total surface area of the contact surface is between about 1% and about 50% of a total surface area of the working surface.

The first, second, and third struts may form a first plurality of unit cells.

The apparatus may be less than five unit cells thick in a direction perpendicular to the contact surface.

The unit cells may be about the same size.

A ratio of the total surface area of the first micro-truss layer at the contact surface to the total surface area of the contact surface may be maintained to be substantially constant when the apparatus is under up to 50% densification strain.

The contact surface may include a plurality of contact points spaced apart from one another, each of the contact points having a contact area in the range from about 100 square microns to about 10 square millimeters.

The apparatus may further include a second micro-truss layer including: a plurality of fourth struts extending along a fourth direction; a plurality of fifth struts extending along a fifth direction; and a plurality of sixth struts extending along a sixth direction, the second micro-truss layer being located between the first micro-truss layer and the contact surface.

The fourth, fifth, and sixth struts may form a second plurality of unit cells and the first, second, and third struts may form a first plurality of unit cells, each of the first unit cells being larger than each of the second unit cells.

The first, second, and third struts may form a first three-dimensional pattern and the fourth, fifth, and sixth struts may form a second three-dimensional pattern, the second three-dimensional pattern differing from the first three-dimensional pattern.

The apparatus may further include an interface connected with the first three-dimensional pattern and the second three-dimensional pattern.

The first and second three-dimensional patterns may have order in three dimensions.

The apparatus may further include a plurality of fourth struts extending in a direction perpendicular to the contact surface.

The apparatus may be configured to be used with an article wearable by a person.

According to another embodiment of the present invention, a method of providing airflow to a working surface includes: configuring a first micro-truss layer to have an open porosity to allow air to flow through the first micro-truss layer, the first micro-truss layer including: a plurality of first struts extending along a first direction; a plurality of second struts extending along a second direction; and a plurality of third struts extending along a third direction, the first, second, and third struts interpenetrating one another at a plurality of nodes, the first, second, and third struts interpenetrating one another at non-perpendicular angles; and configuring the first micro-truss layer to be applied to the working surface, the first micro-truss layer being configured to contact the working surface at a contact surface, a total surface area of the micro-truss layer at the contact surface being between about 1% and about 50% of a total surface area of the working surface.

The first, second, and third struts may be configured to form a first plurality of unit cells.

The micro-truss layer may be less than five unit cells thick in a direction perpendicular to the contact surface.

The unit cells may be about the same size.

The contact surface ma include a plurality of contact points spaced apart from one another, each of the contact points having a contact area in the range from about 100 square microns to about 10 square millimeters.

A ratio of the total surface area of the contact surface to the total surface area of the working surface may be maintained to be substantially constant when the first micro-truss layer is under up to 50% densification strain.

The first micro-truss layer may further include a plurality of fourth struts extending in a direction perpendicular to the contact surface.

The first micro-truss layer may be a portion of: a helmet, an arm rest, a seat, a piece of clothing, a headband, a glove, a shoe insole, eyeglass frames, an undergarment, a mattress, or a mattress topper.

According to another embodiment of the present invention, a method of providing airflow to a working surface includes: configuring a first micro-truss layer to have an open porosity to allow air to flow through the first micro-truss layer, the first micro-truss layer including: a plurality of first struts extending along a first direction, a plurality of second struts extending along a second direction, and a plurality of third struts extending along a third direction, the first, second, and third struts interpenetrating one another at a plurality of nodes, the first, second, and third struts interpenetrating one another at non-perpendicular angles; configuring a second micro-truss layer to have an open porosity for wicking moisture through the second micro-truss layer, the second micro-truss layer including: a plurality of fourth struts extending along a fourth direction, a plurality of fifth struts extending along a fifth direction, and a plurality of sixth struts extending along a sixth direction; configuring the second micro-truss layer to be applied to the working surface, the second micro-truss layer being configured to contact the working surface at a contact surface, a total surface area of the micro-truss layer at the contact surface being between about 1% and about 50% of a total surface area of the working surface; and attaching the second micro-truss layer to the first micro-truss layer, between the first micro-truss layer and the contact surface.

The fourth, fifth, and sixth struts may form a second plurality of unit cells and the first, second, and third struts may form a first plurality of unit cells, each of the first unit cells being larger than each of the second unit cells.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1B:
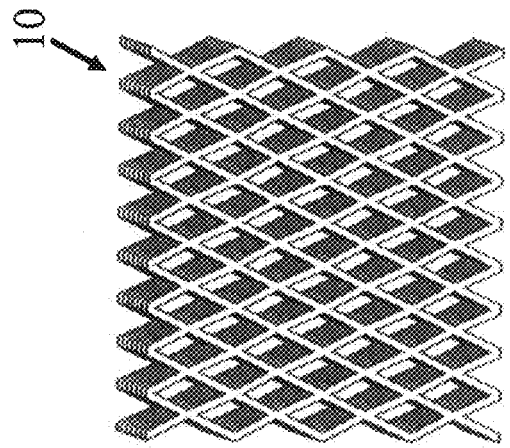
FIG. 1b is a side perspective view of a micro-truss structure which is used in one embodiment of the present invention.
Figure 1C:
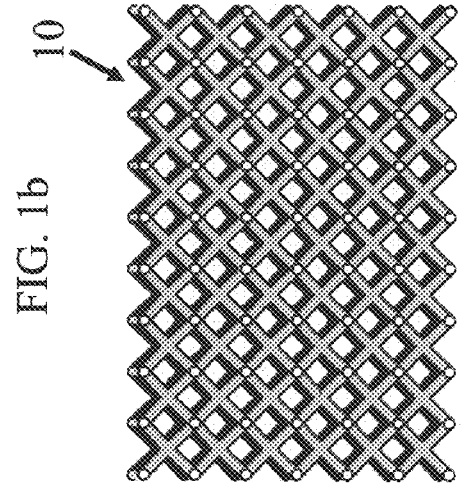
FIG. 1c is a top perspective view of a micro-truss structure which is used in one embodiment of the present invention.
Figure 1A:
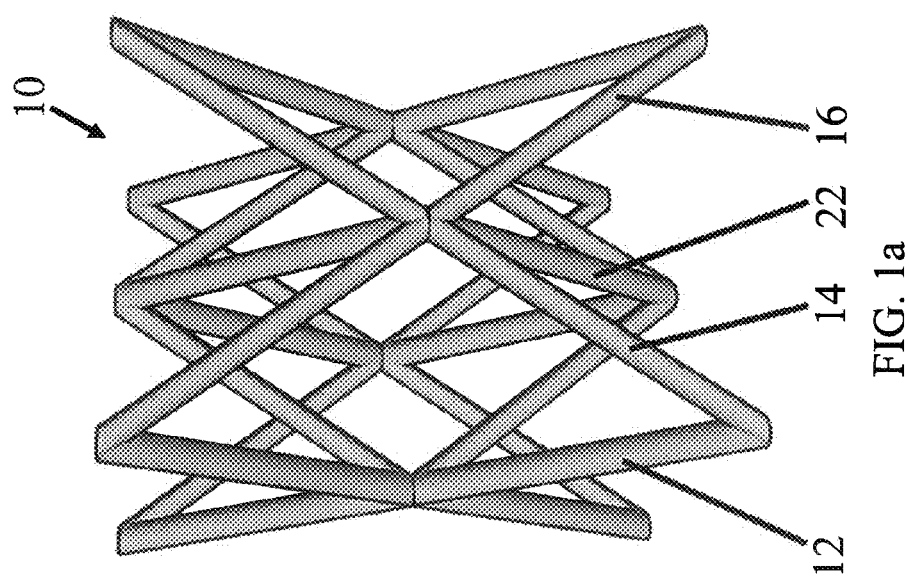
FIG. 1a is a perspective view of a micro-truss structure which is used in one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Aspects of embodiments of the present invention are directed to an apparatus for maintaining an environmental state of a working surface. This environmental state can be provided, for example, by providing increased airflow to the working surface in contact with the apparatus. For example, aspects of embodiments of the present invention relate to a micro-truss based perspiration control layer apparatus for maintaining an environmental state of a surface of a body that generally has restricted air flow during a given activity by enhancing the air flow to that surface. Restricted air flow is a result of the region of the body being in physical contact with an article (e.g., clothing, seating, and control devices) used for that given activity. The micro-truss perspiration control layer includes an ordered open-cellular polymer micro-truss material that serves as a porous contact support area between the article of interest and the relevant region of the body. The ordered open porosity, in combination with the feasible size-scale of the micro-truss features, enable comfortable contact with the body without sacrificing air flow. Single micro-truss unit cells and structures including many unit cells according to embodiments of the present invention, are shown in FIGS. 1a, 1b, 1c, and 1d. These unit cells are only some of many possible unit cell architectures that could be utilized for this application. Examples of additional possible unit cell architectures include, but are not limited to, structures described in Jacobsen et al, Acta Materialia 56 (2008) 2540-254, the entire disclosure of which is incorporated herein by reference.

Referring to FIGS. 1a, 1b, 1c, 1d, 2a, 2b, and 2c, a three-dimensional ordered open-cellular micro-truss structure 10 according to an embodiment of the present invention, is a self-supporting structure. The micro-truss 10 includes a plurality of angled struts (which may also be referred to as angled "truss elements," "truss members," or "polymer waveguides") including first angled struts 12, second angled struts 14, and third angled struts 16, which extend along a first direction A, a second direction B, and a third direction C, respectively. In some embodiments, the micro-truss 10 also includes vertical struts 18 which extend along a vertical direction D. With reference to FIGS. 1a, 1b, 1c, 2a, 2b, 2c, 2d, and 2e, the first, second, and third angled struts 12, 14, 16 (and the vertical struts 18 in FIGS. 2a, 2b, 2c, 2d, and 2e) interpenetrate each other at nodes 20 to form a continuous material with a three-dimensional microstructure order. In some embodiments, the micro-truss further includes fourth angled struts 22 which extend along a fourth direction E and which also interpenetrate with the first, second, and third angled struts 12, 14, and 16 and the vertical struts 18 at nodes 20.

The struts 12, 14, 16, and 18 may include a photo-polymer material. The struts 12, 14, 16, and 18 may be polymer optical waveguides.

The continuous material may be continuously formed such that it lacks any interior boundaries, e.g., boundaries within the interpenetrating portions of struts 12, 14, 16, and 18. Each node 20 of the micro-truss structure 10 may be formed of the continuous material.

According to one embodiment of the present invention, the micro-truss 10 is formed by using a fixed light input (collimated UV light) to cure (polymerize) polymer optical waveguides, which can self-propagate in a 3D pattern. As such, the propagated polymer optical waveguides form the micro-truss 10.

As disclosed in Monro et al. "Topical Review Catching Light In Its Own Trap," Journal Of Modern Optics, 2001, Vol. 48, No. 2, 191-238, which is incorporated by reference herein in its entirety, some liquid polymers, referred to as photopolymers, undergo a refractive index change during the polymerization process. The refractive index change can lead to a formation of polymer optical waveguides. If a monomer that is photo-sensitive is exposed to light (typically UV) under the right conditions, the initial area of polymerization, such as a small circular area, will "trap" the light and guide it to the tip of the polymerized region, further advancing that polymerized region. This process will continue, leading to the formation of a waveguide structure with substantially the same cross-sectional dimensions along its entire length.

According to one embodiment of the present invention, a mask with a two-dimensional pattern of apertures 340 (see FIGS. 4a and 4b) is used with a light source and photo-monomer to create an ordered 3D polymer micro-truss structure (or an open-cell polymer micro-truss structure).

Figure 3A:
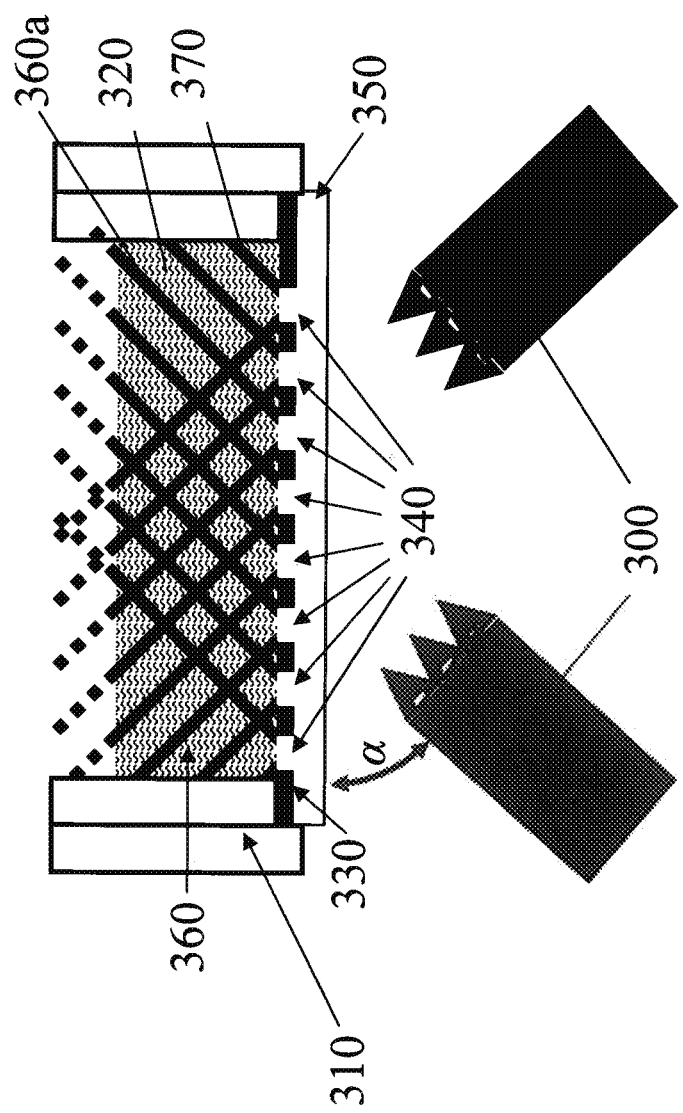
FIGS. 3a and 3b are schematic cross-sectional diagrams of a system for forming a structure from multiple waveguides created using a single collimated beam or multiple collimated beams passing through multiple apertures located at the bottom of the channel in both angled and vertical directions according to one embodiment of the present invention.

FIG. 3a is a schematic cross-sectional diagram of a system for forming a structure from multiple waveguides (or struts) created using a single collimated beam or multiple collimated beams passing through multiple apertures located at the bottom of the channel. With reference to FIG. 3a, a system for forming an ordered 3D polymer micro-truss structure according to an embodiment of the present invention, includes one or more collimated light sources 300, a channel/mold 310 having (or containing) a photo-monomer 320 that will polymerize at a wavelength of collimated light beams provided by the light sources 300, and a patterning apparatus, such as a mask 330 with one or more apertures (open areas) 340. Each of the apertures 340 has a given shape and dimension substantially matching a cross-sectional geometry of a strut (e.g. waveguide 360a).

Continuing with FIG. 3a, the mask 330 rests on the transparent substrate (or transparent plate) 350 that includes the bottom of the channel/mold 310. In one embodiment, the mask 330 is made of a lightweight, flexible, and opaque material such as polyethylene terephthalate (PET) film. The transparent substrate 350 may be made of a material (such as quartz) that is transparent to the light emitted from the collimated light sources, such that the collimated light shines into an exposure area 410 of the channel. In other embodiments, the transparent substrate 350 acts as the mask 330 (e.g., portions of the transparent substrate 350 are opaque while other portions are transparent). The photo-monomer 320 fills the channel 310 above the mask 330. In one embodiment, different thicknesses of micro-truss structures can be achieved by filling the channel (or mold) 310 with photo-monomer 320 to the desired height. Once the collimated light source is applied, the intersecting polymer waveguides 360a will grow upward from the surface of the mask 330 or the surface of the transparent substrate 350, terminating at the free (e.g., upper) surface of the photo-monomer 320 in the channel 310 to form struts of the micro-truss structure.

Figure 4B:
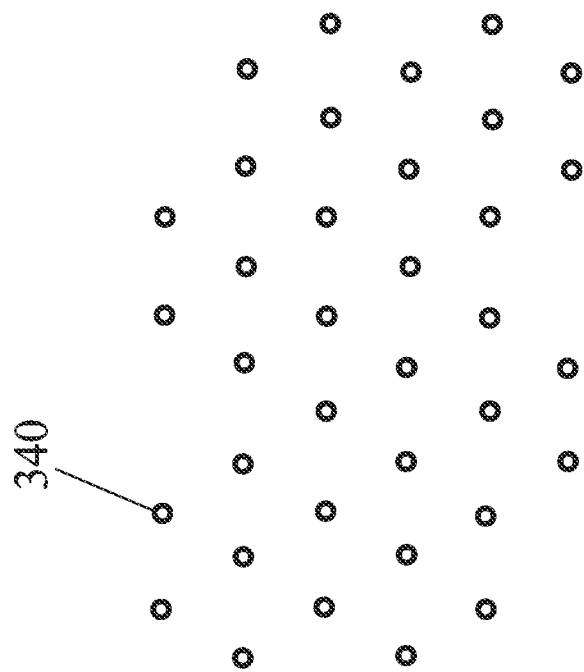
FIG. 4b illustrates a hexagonal mask pattern (or a hexagonal mask aperture pattern) according to an embodiment of the present invention.
Figure 4A:
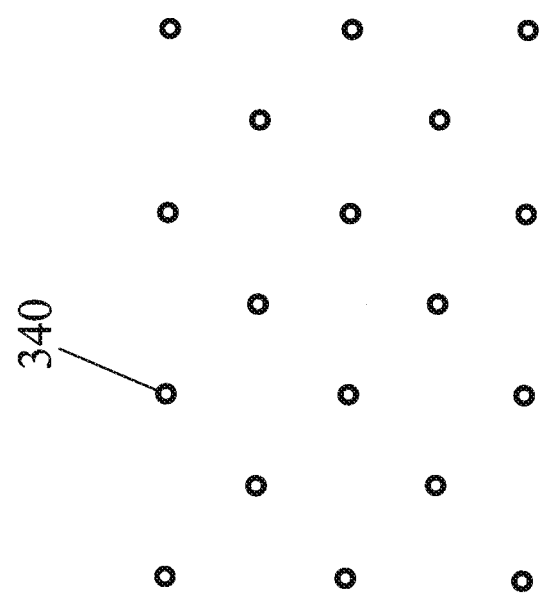
FIG. 4a illustrates a square mask pattern (or a square mask aperture pattern) according to an embodiment of the present invention.
Figure 5A:
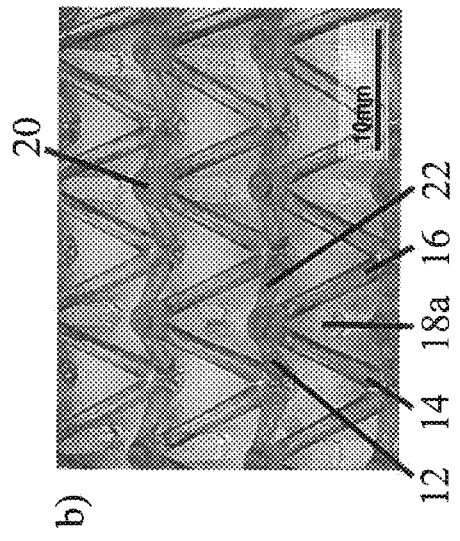
FIG. 5a is a perspective view of four angled struts and one vertical strut intersecting at a node according to one embodiment of the present invention.
Figure 5B:
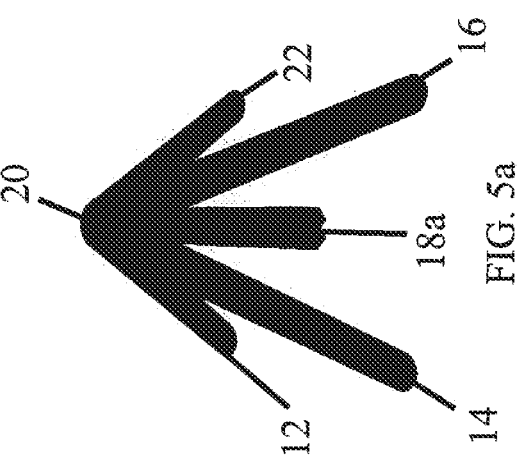
FIG. 5b is a photograph of a micro-truss structure according to one embodiment of the present invention.
Figure 5C:
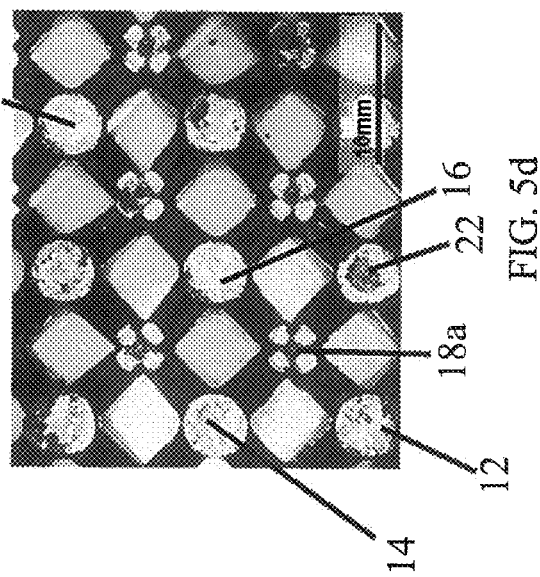
FIG. 5c is a perspective view of four angled struts and one vertical strut intersecting at a node according to one embodiment of the present invention.
Figure 5D:
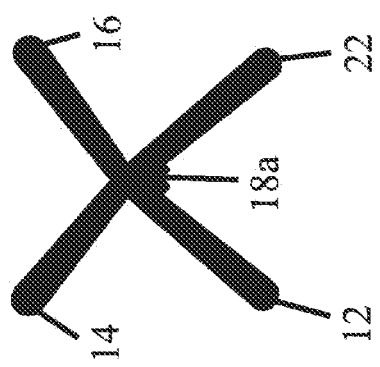
FIG. 5d is a photograph of a micro-truss structure taken in plan view according to one embodiment of the present invention.

Here, in FIG. 3a, a 3D network (or micro-truss structure 360) can be formed because the intersecting polymer waveguides 360a (or struts) will polymerize together, but will not interfere with waveguide propagation. Also, the spacing between the plurality of waveguides 360a (or struts) corresponds with the pattern of the plurality of apertures 340. The pattern of the apertures 340 may, for example, be in a square pattern as shown in FIG. 4a and/or in a hexagonal pattern as shown in FIG. 4b. The hole (aperture) spacing, i.e., distance between apertures 340 in the mask 330, and the number of waveguides 360 (or struts) formed from each of the apertures 340, will determine the open volume fraction (i.e. open space) of the formed ordered 3D micro-truss structure (or the formed open-cell polymer micro-truss structure).

As such, using the system of FIG. 3a, an ordered 3D micro-truss structure 360 can be designed for various applications. The design parameters include: 1) the angle and pattern of the polymer struts with respect to one another, 2) the packing, or relative density of the resulting cell structure (or the open volume fraction), and 3) the cross-sectional shape and dimensions of the struts. Here, in some embodiments, the strut (or waveguide) diameter can range from 10 microns to 10 mm depending on the design criteria. In some embodiments, the strut diameter can range from 10 microns to 1 mm in order to improve user comfort.

In one embodiment, the length of the strut between nodes of interpenetrating struts can be between 5 and 15 times the diameter of the strut. In addition, the number of nodes, or the number of repeating unit cells, through the thickness of the 3D micro-truss structure can be designed. A micro-truss structure may have ½ unit cell to 10 unit cells through its thickness. Moreover, the propagation distances and the size of the nodes of the interpenetrating waveguides (or struts) are unperturbed by the change in the index of refraction caused by polymerization, due to the method of formation of the ordered 3D micro-truss structure (or the open-cell polymer micro-truss structure).

Figure 1D:
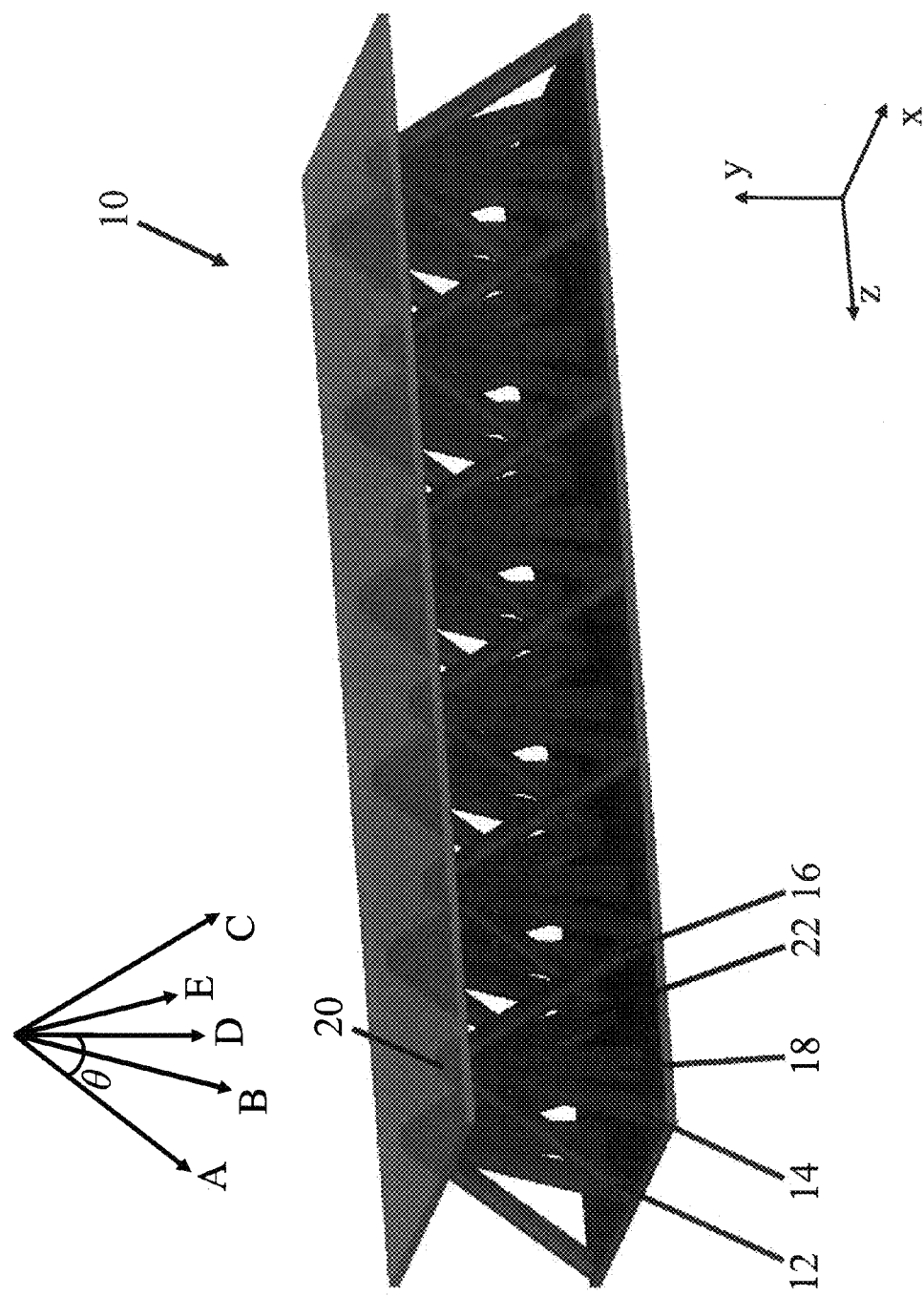
FIG. 1d is a perspective view of a micro-truss structure, having vertical struts, which is used in one embodiment of the present invention.

In one embodiment, first, second, and third directions in which first, second, and third struts respectively extend include first, second, and third angles; the first, second, and third angles having first, second, and third inclinations θ (e.g., with respect to the xz-plane as shown in FIG. 1d) and first, second, and third azimuths (e.g., about the y-axis as shown in FIG. 1d). In one embodiment, the first, second, and third inclinations each may have the same or different values and each is in a range from 45° to 70° off the plane of the mask, inclusive. Similarly, in one embodiment, the vertical struts may have an inclination from 80° to 90° off the plane of the mask, inclusive (see, e.g., angle γ in FIGS. 3b and 3d).

The inclinations θ at which the first, second, and third struts extend (see, e.g., FIGS. 1d and 7) may be determined by an angle α (see, e.g., FIG. 3a) at which the collimated light sources 300 are oriented with respect to the mask 330 such that the collimated light passes through the apertures 340 of the mask 330 at an angle α. Due to the refractive index change between air and the mask and monomer, in many instances, the angles θ and α will not be the same.

Figure 3B:
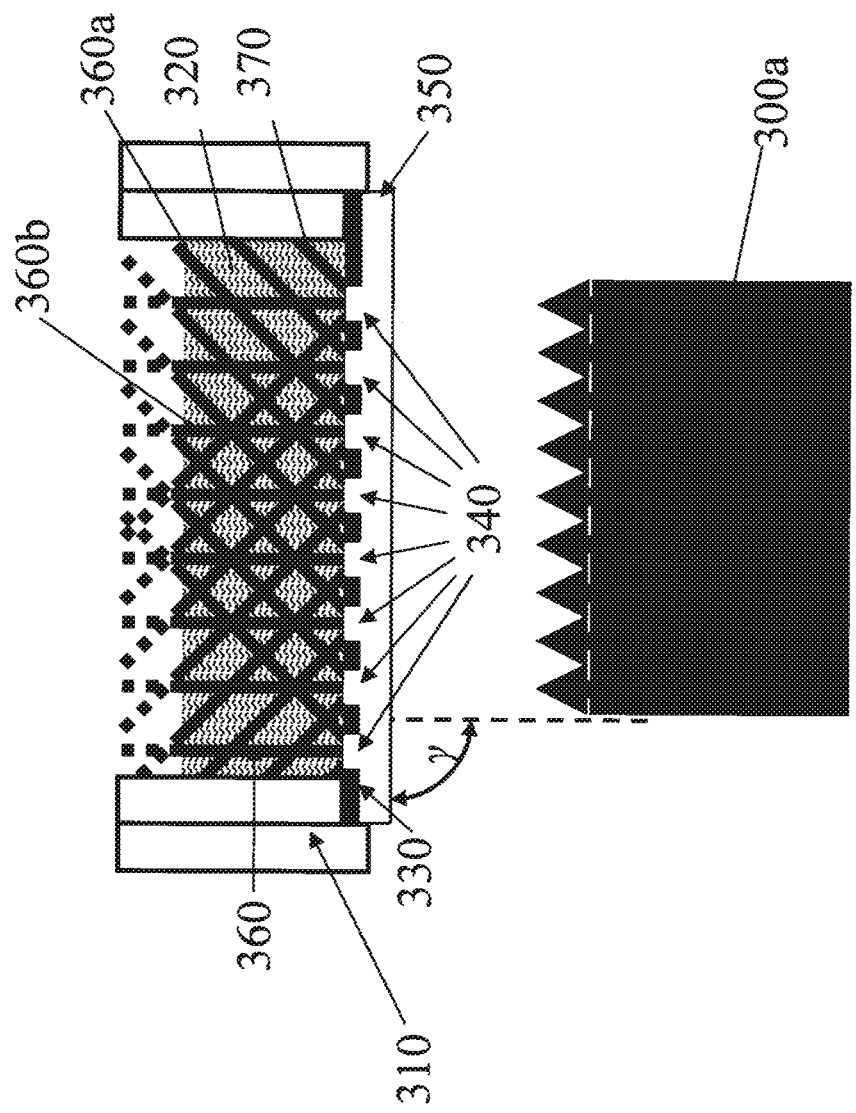
Figure 3C:
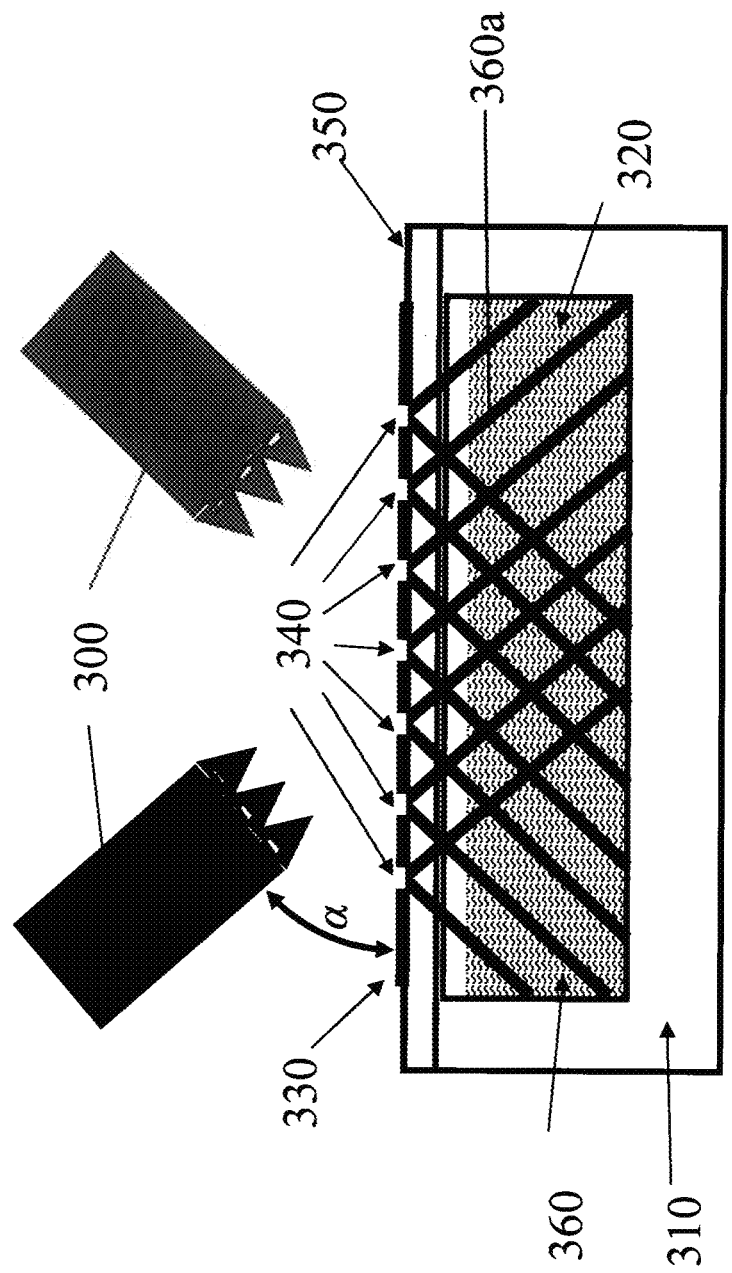
FIGS. 3c and 3d are schematic cross-sectional diagrams of a system for forming a structure from multiple waveguides created using a single collimated beam or multiple collimated beams passing through multiple apertures located at the top of the channel in both angled and vertical directions according to one embodiment of the present invention.
Figure 3D:
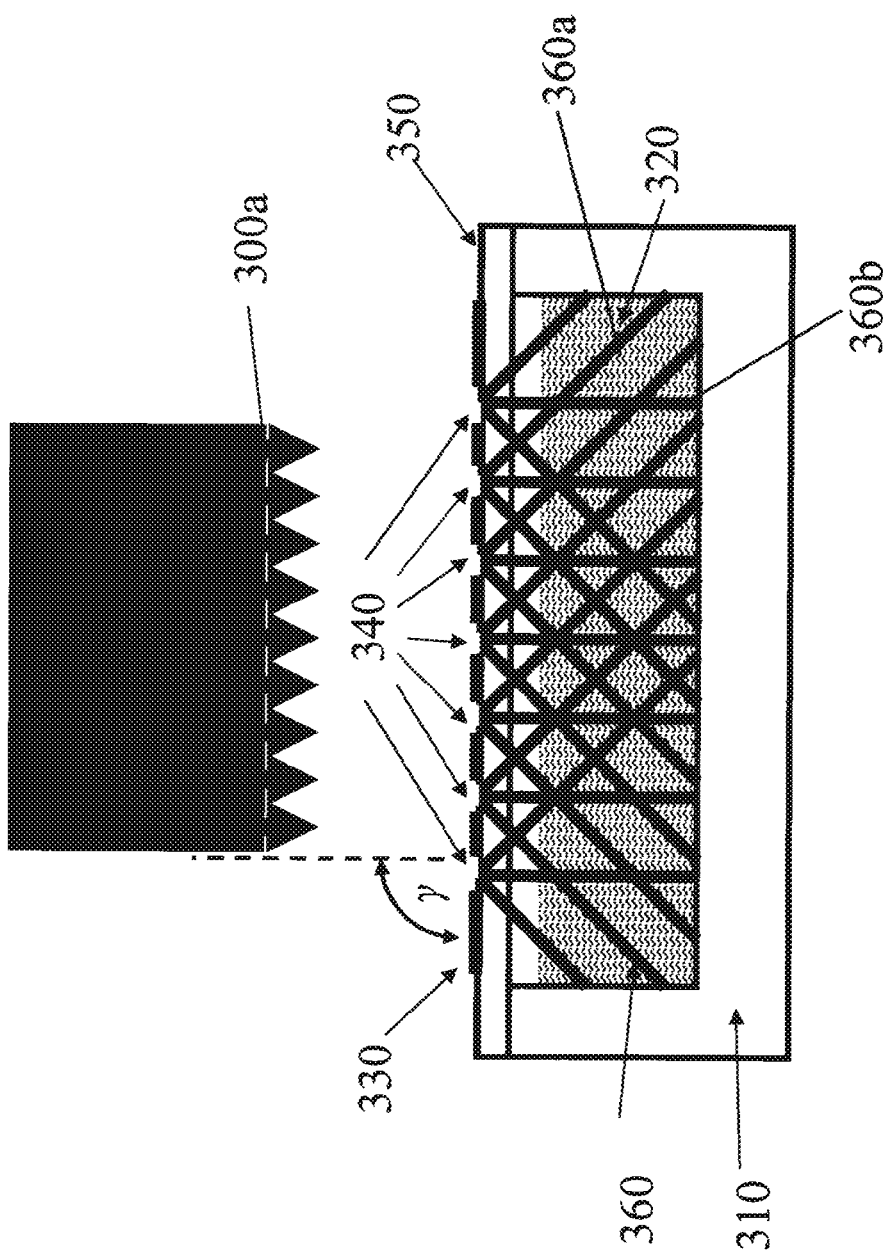

According to one embodiment of the present invention, the struts further include vertical struts 360b extending in a fourth direction with an inclination of substantially 90° (e.g., substantially perpendicular to the xz-plane). As illustrated in FIG. 3b, collimated light source 300a is oriented to emit light in a direction substantially perpendicular with respect to the mask 330.

In one embodiment, the vertical waveguides 360b (or struts) are formed after the angled waveguides 360a (or struts) are formed. The vertical waveguides 360b may be formed by using different collimated light sources 300a or may be formed using the same collimated light sources 300 that are used to form the angled waveguides by repositioning the collimated light sources 300 to emit light in a direction substantially perpendicular to the mask 330.

In another embodiment, the vertical waveguides 360b are formed concurrently with the angled waveguides 360b in which angled collimated light sources 300 and vertically oriented collimated light sources 300a concurrently emit light through apertures 340 in the mask 330.

Figure 2B:
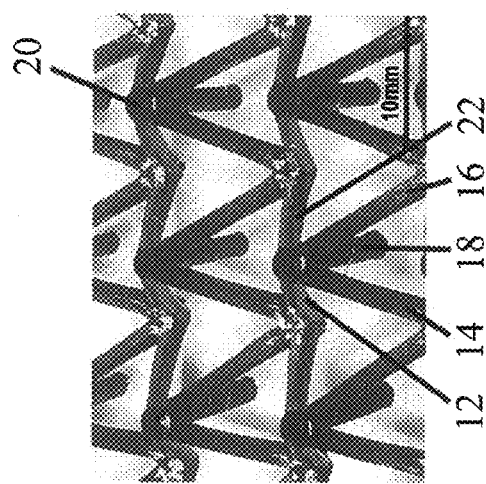
FIG. 2b is a photograph of a micro-truss structure according to one embodiment of the present invention.
Figure 2E:
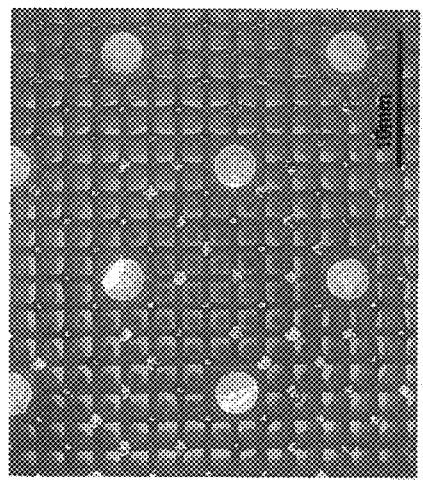
FIGS. 2d and 2e are photographs of a micro-truss structure taken in cross-sectional and plan views, respectively, wherein the micro-truss structure includes a plurality of angled struts, thin vertical struts, and thick vertical struts according to one embodiment of the present invention.
Figure 2D:
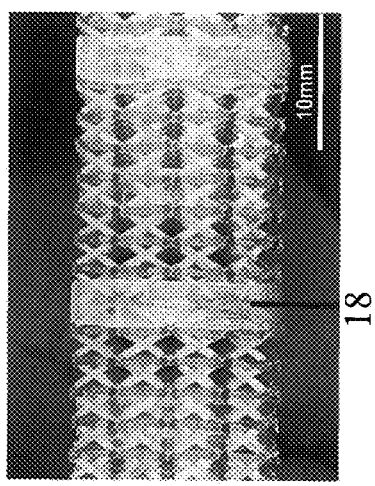
Figure 2A:
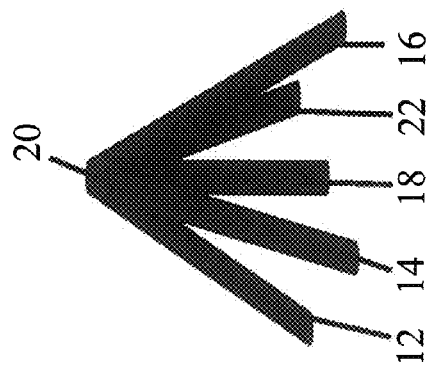
FIG. 2a is a perspective view of four angled struts and one vertical strut intersecting at a node according to one embodiment of the present invention.
Figure 2C:
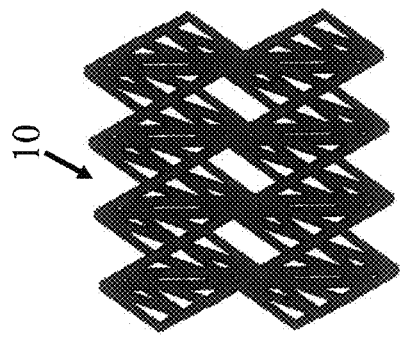
FIG. 2c is a perspective view of a micro-truss structure including a plurality of angled and vertical struts according to one embodiment of the present invention.

Although the vertical waveguides 360b (or vertical struts 18) are described above and are illustrated in, for example, FIG. 1d and FIG. 2a as having a diameter (or cross sectional area) substantially equal to that of the angled waveguides 360a (or angled struts 12, 14, and 16), according to other embodiments of the present invention, the vertical waveguides 360b (or vertical struts 18) may have a different diameter (or cross sectional area) than that of the angled waveguides (or angled struts 12, 14, and 16). For example, in some embodiments the vertical waveguides 360b may have a diameter in the range from 10 microns to 20 mm. In some embodiments the micro-truss structure includes vertical struts that are equal in diameter (or cross sectional area) to the angled struts as well as vertical struts that have diameters (or cross sectional areas) different from those of the angled struts. In other embodiments, the diameters (or cross sectional areas) of the vertical struts of the micro-truss structure may all be different from the diameters (or cross sectional areas) of the angled struts. FIGS. 2d and 2e are photographs of a side view and a top view, respectively, of a micro-truss structure having both angled struts 12, 14, and 16 and vertical struts 18, the vertical struts 18 having a larger diameter (or cross sectional area) than the angled struts 12, 14, and 16.

In embodiments in which the vertical waveguides 360b (or vertical struts 18) have a diameter (or cross sectional area) different from the diameters of the of the angled waveguides 360a (or angled struts 12, 14, and 16), the vertical waveguides 360b may be formed using a mask having apertures that are larger or smaller than the apertures 340 of the mask 330 used to form the angled waveguides 360a. In another embodiment, the apertures of the mask used to form the vertical waveguides may have apertures that are spaced closer or farther apart than the apertures 340 of the mask 330 used to form the angled waveguides 360a. For example, the vertical waveguides may be formed through every node formed by the angled struts, or every second or third node formed by the angled struts. In still other embodiments, the vertical struts are arranged in a pattern that does not coincide with (e.g., is independent of) the pattern of the angled struts.

In another embodiment, a single mask having a plurality of apertures which may have different sizes may be used, and collimated light aimed perpendicular to the plane of the mask or at an angle is selectively emitted through the apertures of the mask.

Referring, for example, to FIG. 3b, in some embodiments, at least one digital mask may be used in place of the mask 330 below, above, or to either side of the channel 370, or in any combination of these locations between the collimated light sources and the photo-monomer 320. A digital mask is a display device which can be controlled to become opaque at some locations and transparent at other locations to the wavelength of light used to polymerize the photo-monomer, such as a liquid crystal display (LCD). One such liquid crystal display mask is disclosed in the paper by A. Bertsch, P. Bernhard, and P. Renaud, (2001) "Microstereolithography: Concepts and applications," presented at the 8th International IEEE Conference on Emerging Technologies and Factory Automation, Vol. 2, pp. 289-99, the entire disclosure of which is incorporated herein by reference. In embodiments where the collimated light sources 300 are located below the channel, the digital mask is located between the collimated light sources 300 and the transparent substrate 350. Additionally, the digital mask can be configured on-the-fly to display any variation of aperture sizes and patterns to produce the desired micro-truss structure 360, eliminating the need for stopping fabrication to change masks. For example, the digital mask may be used to from differently sized apertures for the angled struts and the vertical struts.

As such, in the above described embodiments of the present invention, the diameters (or cross sectional areas) and spacing of the vertical waveguides 360b (or the vertical struts 18) can be varied independently of the diameters (or cross sectional areas) and spacing of the angled waveguides 360a (or angled struts 12, 14, and 16). Therefore, the resistance of the micro-truss structure 10 to compression and shear forces can be adjusted independently based on the diameters (or cross sectional areas) and spacing of the vertical and angled waveguides 360b and 360a (or vertical and angled struts).

If all of the struts are at an equal angle θ with respect to the mask, the compression modulus (E) can be approximated by:

$$E \approx E_s (\sin^4 \theta)(\rho/\rho_s)$$

where $\rho$ is the density of the micro-truss structure 10, $\rho_s$ is the density of a solid material portion of the micro-truss structure 10, and $E_s$ is a modulus of the solid material portion of the micro-truss structure 10.

If all of the struts are at equal angle θ with respect to the mask, the shear modulus (G) can be approximated by:

$$G \approx (E_s/8)(\rho/\rho_s)(\sin^2 2\theta)$$

The compression modulus (E) of a micro-truss structure which includes both angled and vertical struts can be approximated by:

$$E \approx E_s(\rho/\rho_s)[(\sin^4 \theta)(f_{angled})+(f_{vertical})]$$

where $f_{vertical}$ is the fraction of the solid in the vertical orientation and $f_{angled}$ is the fraction of solid in the angled orientation at angle $\theta$ and where $f_{vertical}=1-f_{angled}$.

According to the shear modulus equation, vertical struts will significantly contribute to the shear modulus, so the shear modulus for a micro-truss structure which includes both angled and vertical struts can be approximated by:

$$G \approx (E_s/8)(\rho/\rho_s)(f_{angled})(\sin^2 2\theta)$$

The equation above predicts that the shear modulus (G) is maximized when the angled struts extend at an angle $\theta=45°$. Therefore, according to one embodiment of the present invention, the angled struts may extend at an angle of about 45°. However, in other embodiments of the present invention, the angled struts may extend at different angles (e.g., between 45° and 90°) so that the angled struts may provide additional compression resistance in conjunction with the vertical struts or in order to reduce the distance in which the collimated light forming the angled struts must propagate.

Therefore, the resistance of a micro-truss structure 10 to shear and compression forces can be designed by varying the diameters (or cross sectional areas) and volume fraction of the vertical and angled struts, and varying the angle of the angled struts in accordance with the requirements of the applications to which the micro-truss structure will be applied. For example, the strut diameter (or cross sectional area) may be in the range of about 10 μm to about 10 mm and the volume fraction ratio of vertical struts to angled struts could be between about 2% and about 70%.

According to one embodiment of the present invention, as illustrated in FIGS. 1d, 2a, 2b, and 2c, the angled struts 12, 14, and 16 and the vertical struts 18 intersect at the nodes 20 to form symmetrical angles in three-dimensions (three orthogonal directions). The symmetrical angles relative to the xz-plane (see, e.g., FIG. 1d), can measure between 0° and 90°. That is, the angled struts 12, 14, and 16 and the vertical struts 18 interpenetrate each other to form "perfect" nodes: each of the struts 12, 14, 16 defines an angle relative to a compression surface of the micro-truss 10 (e.g. a surface extending along a direction of the xz-plane), as well as with respect to the vertical struts 18, and the respective angles defined by the angled struts 12, 14, 16 are substantially equal to one another. However, embodiments of the present invention are not limited thereto.

In a further embodiment of the present invention, the polymer micro-truss structure is coated with a material different from the material of the polymer micro-truss structure itself, and the polymer micro-truss structure is removed to create a self-supporting structure having continuous but separated volumes. In one embodiment of the present invention, the polymer micro-truss structure may be coated with a metal such as nickel, aluminum, titanium, steel, and alloys thereof, which may improve the thermal conductivity of the antiperspiration layer. Electro-deposition, slurry deposition, physical vapor deposition (PVD), or chemical vapor deposition (CVD) may be used to coat the polymer micro-truss structure. The polymer micro-truss structure can then be removed by burning or etching using a strong base, leaving a hollow, metal micro-truss structure. According to one embodiment of the present invention, each of the hollow metal struts may have an inner diameter in the range of 10 microns to 10 mm and the thickness of the metal (or the wall thickness) is in the range of 1 micron to 1 mm. The resulting metal micro-truss structure may have a relative density in the range 0.5% to 30% with respect to a solid metal block.

Additional improvements in compression strength may be realized through architectural optimization. Architectural optimization refers to trading off unit cell design, strut diameter, length, angles, number of struts per unit cell, and materials to achieve a desired set of properties (e.g., a desired level of densification from an impact or pressure wave).

Referring to FIGS. 5a, 5b, 5c, and 5d, in some embodiments of the present invention, the vertical truss struts 18a have a non-circular cross section. The particular shape of the vertical truss struts 18a depends on the number of angled struts which interpenetrate at the nodes 20 through which the vertical struts interpenetrate the angled struts 12, 14, 16, and 22.

In the embodiments illustrated in FIGS. 5a, 5b, 5c, and 5d, four angled struts 12, 14, 16, and 22 interpenetrate at nodes 20. If the vertical strut 18a is formed in a subsequent exposure step (after the four angled struts have been formed), the vertical strut 18a has a "cross" or "plus" shape (see, e.g., FIG. 6a).

Figure 6C:
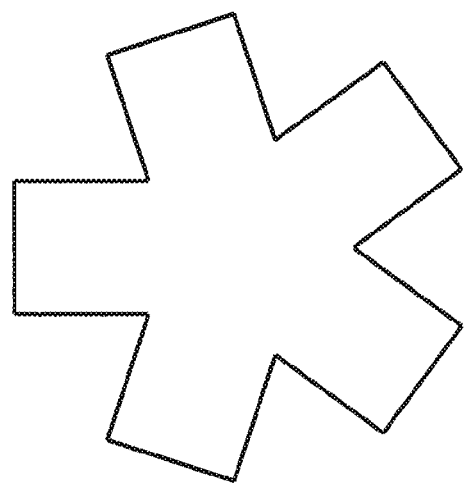
FIGS. 6a, 6b, and 6c are illustrations of cross-sectional shapes of vertical struts according to some embodiments of the present invention.
Figure 6B:
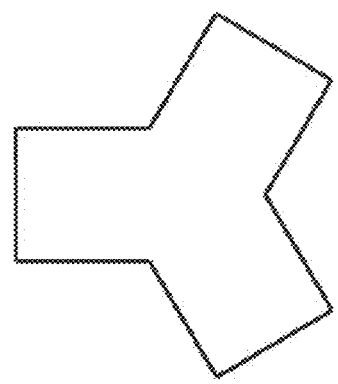
Figure 6A:
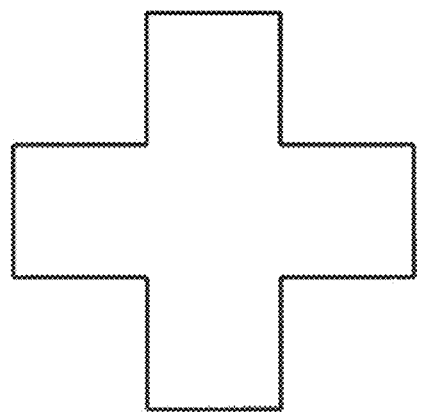

FIGS. 6a, 6b, and 6c illustrate cross-sectional shapes of the vertical struts according to other embodiments of the present invention. In embodiments which include n angled struts interpenetrating at nodes 20, the vertical struts interpenetrating the angled struts at those nodes 20 would have n petals (where n is a natural number). For example, as illustrated in FIG. 6b, in an embodiment of the present invention which includes three angled struts, the vertical struts would have three petals (e.g., a three-pointed star with truncated tips). FIG. 6c illustrates the cross-sectional shape of the vertical struts in an embodiment in which five angled struts interpenetrate at the nodes. This effect diminishes as the vertical struts increase in diameter with respect to the diameter of the angled struts. For example, the shape of the vertical struts becomes more cylindrical and is substantially cylindrical when the vertical struts have a diameter about ten times the diameter of the angled struts. At smaller sizes, the cross-sectional shape of the vertical struts may be a combination of a shape similar to those illustrated in FIGS. 6a, 6b, and 6c and a circular shape. For example, as the vertical struts increase in diameter compared to the diameter of the angled struts, the radial size of the petals may decrease.

Figure 7:
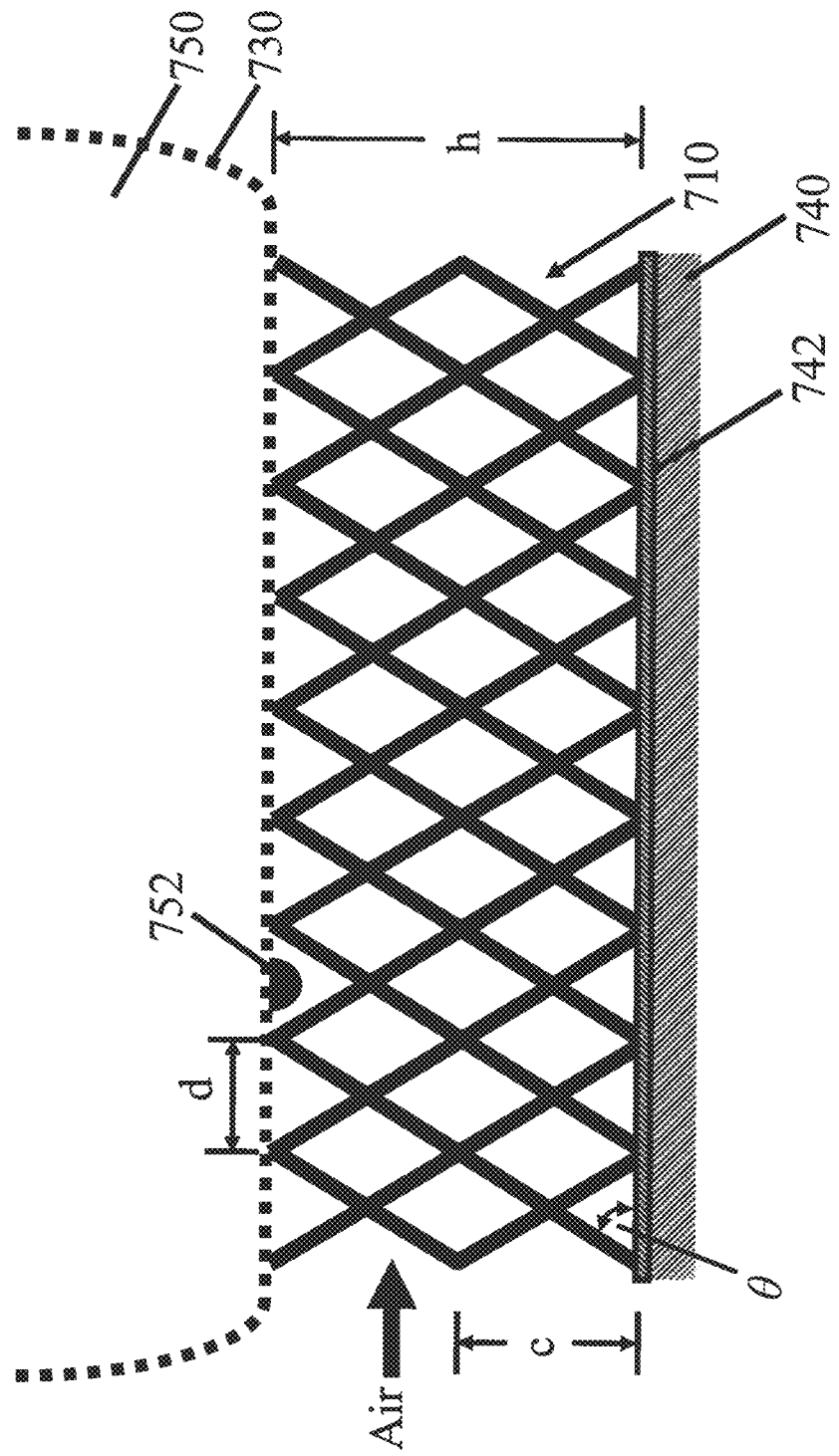
FIG. 7 is a schematic diagram of a micro-truss perspiration control layer according to a first embodiment of the present invention, in contact with and located between a body and an article of interest.

FIG. 7 depicts an apparatus 710 for maintaining an environmental state of a surface (e.g., a micro-truss perspiration control structure), which includes a micro-truss structure 10, according to one embodiment of the present invention, located between an article 740 and a body 750, or other item of interest that is utilized for a given activity. As discussed above, the length of the struts 14, 16, and 18 between adjacent nodes may be between 5 to 15 times the diameter of the strut. As such, the height c of an individual unit cell depends on the spacing between nodes of the apparatus 710 as well as the angles of inclination $\theta$ of the struts 14, 16, and 18. For example, if the diameter of the strut is 100 microns and the angle of inclination $\theta$ of the struts is 60°, then the height of the unit cell may be about 86.6 microns. As discussed above, in some embodiments, the apparatus 710 has a thickness (or height) h in the range from ½ to 10 unit cells. In some embodiments, the apparatus 710 is bonded to the article 740 by a bonding material 742 (e.g., epoxy, polyurethane, etc.) along a bond line. The ability of air to flow through the micro-truss perspiration control layer is influenced by the total amount of open porosity (e.g., the open volume fraction), the representative shape of the unit cell that comprises the open porosity, and the distribution of the open porosity (i.e. unit cell size) of the apparatus 710. As sweat 752 is secreted from the body 750 and percolates to the apparatus 710 (possibly through a clothing layer 730), air in the open volume of the micro-truss can evaporate the sweat 752 and cool the region of the body 750 in contact with a contact surface of the apparatus 710, the contact surface being defined by the portions of the apparatus which come in contact with the working surface (e.g., the surface of the body 750). As such, the area of the contact surface (e.g., the sum of the areas of each of the points of contact) is generally significantly smaller than the area of the working surface. The ordered open porosity of the micro-truss allows natural and/or forced convective cooling over regions of the body 750 that would otherwise have limited or no access to air flow if they were in direct contact with the article of interest 740.

The design of the apparatus 710 determines the total surface area of the apparatus 710 that is in contact with the body 750, and thus the total open area that permits access to air. The ratio of contact area between the apparatus 710 and the body 750 to the total coverage area of the apparatus 710 can range from <1% to over 50% depending on the desired application. The total contact surface area with the body can be altered during the design process by altering the size of the micro-truss unit cell features. For example, the individual contact points of the apparatus 710 can range from 100 square microns to 10 square mm in diameter, where the ratio of the area of the contact surface to the area of the working surface (e.g., body 750) is <50% of the total area of the working surface. In some embodiments, the area of the contact surface may be <30% of the area of the working surface, in which case ≥70% of the working surface would be exposed to the air. In still other embodiments, the area of the contact surface may be <10% of the area of the working surface, in which case ≥90% of the working surface would be exposed to the air.

Furthermore, in embodiments of the present invention, the ratio of the contact area between the apparatus 710 and the body 750 can be kept substantially constant (e.g., less than 10% change) even when the apparatus 710 is compressed to up to 50% of its densification strain, the "strain" being defined as the ratio of the displacement to the unstressed length of the material and the "densification strain" being defined as the strain at which the force required to further displace (e.g., compress) the material sharply increases due to densification of the material. In embodiments of the present invention, the densification strain of the apparatus can be controlled by modifying the relative density, which depends on the diameters and spacing of the angled and vertical struts 12, 14, 16, and 18. As such, an apparatus according to one embodiment of the present invention may have a densification strain of 0.9 and the ratio of the contact area between the apparatus and the body may be kept substantially constant at up to a strain of 0.45. An apparatus according to another embodiment of the present invention may have a densification strain of 0.7 and the ratio of the contact area and the working area may be kept substantially constant at up to a strain of 0.35.

Figure 8:
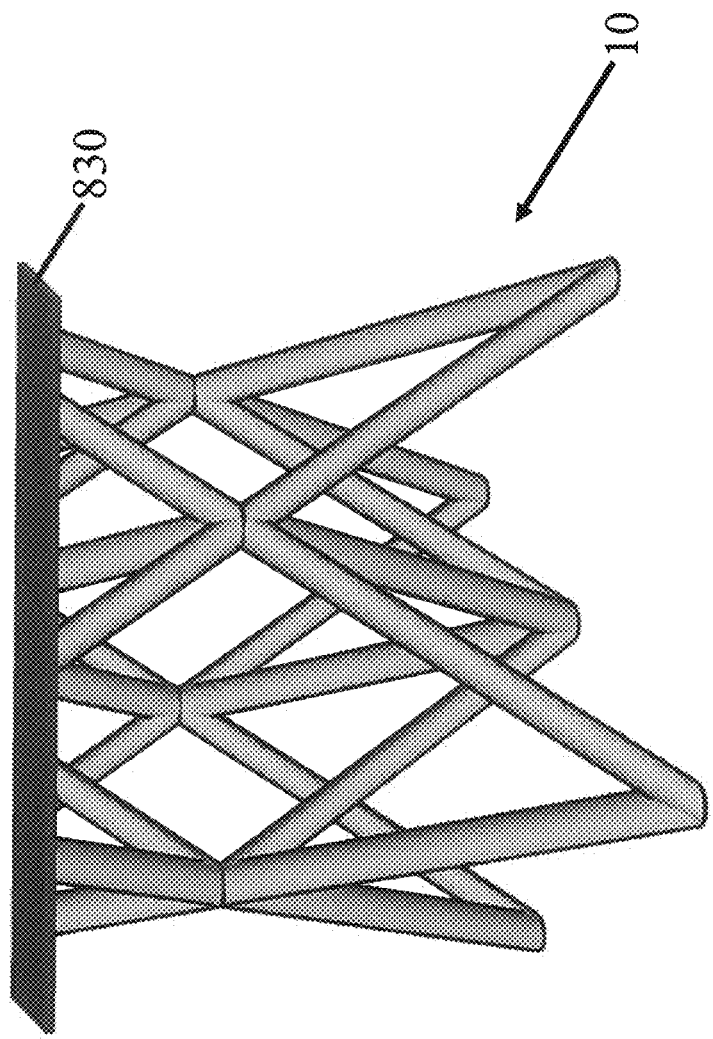
FIG. 8 is a perspective view of a micro-truss layer having a face sheet located halfway through a unit cell according to a second embodiment of the present invention.
Figure 9:
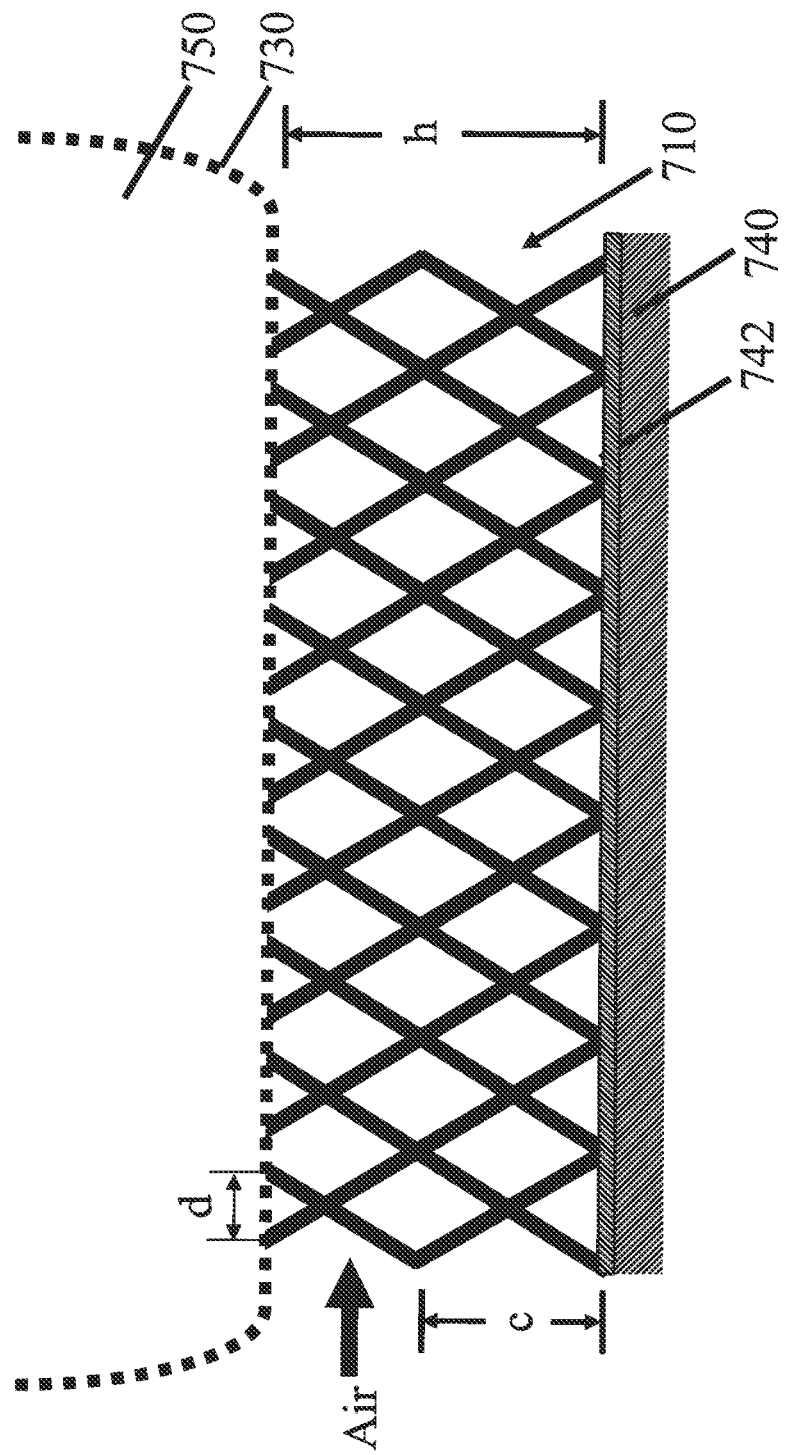
FIG. 9 is a schematic diagram of a micro-truss perspiration control layer according to the second embodiment of the present invention, in contact with and located between a body and an article of interest.

The effectiveness of the apparatus 710 depends on both the percentage of open area within the total coverage area and the distribution of the open area. As the contact points of the apparatus 710 increase in size—for example, with increasing strut diameter—the restricted access to air at those contact points (in other words, the increasing area of the total contact surface) can lead to "hot spots". In addition, the span (or distance d) between contact points can affect the overall comfort of the micro-truss perspiration control layer. For example, larger contact points spaced farther apart may lead to uncomfortable pressure points for the user. In some embodiments of the present invention, the distance between neighboring contact points may range from 100 μm to about 10 mm. It is also possible to alter the contact surface area without significantly altering the total open porosity within the apparatus 710 by changing the unit cell architecture or by controlling the solid region within each unit cell that makes up the contact surface area. For example, the surface area of the contact surface for the apparatus 710 shown in FIG. 7 can be increased by up to 400% depending on whether the contact surface is along a two-dimensional plane 830 (see, e.g., FIG. 8) coincident with a layer of nodes (as in the embodiment of FIG. 7), or the contact surface is along a 2D plane between node layers, as shown in the embodiments of FIGS. 8 and 9.

Figure 10:
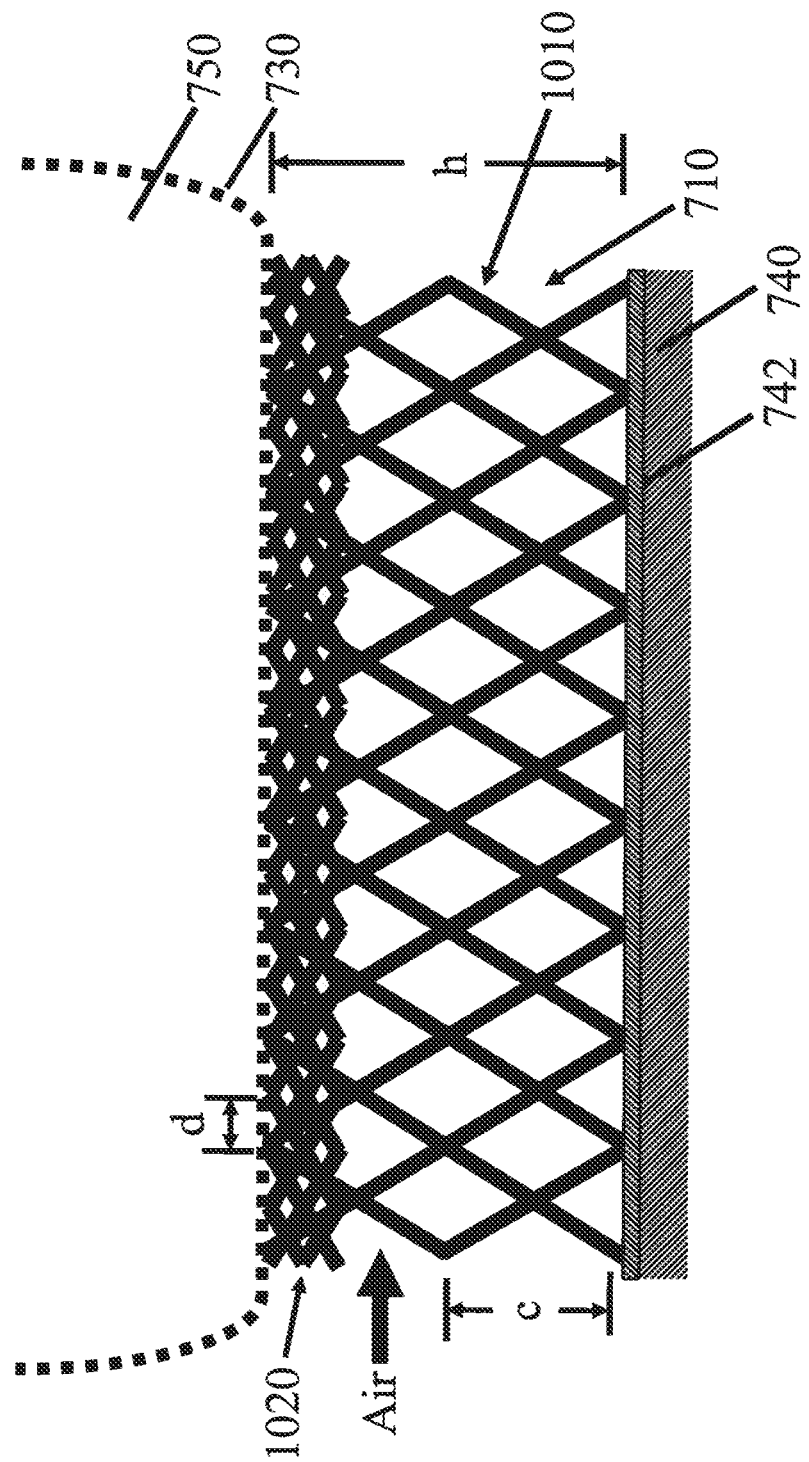
FIG. 10 is a schematic diagram of a micro-truss perspiration control layer according to a third embodiment of the present invention, in contact with and located between a body and an article of interest.

According to embodiments of the present invention, the apparatus 710 enables in-plane air flow to aid with sweat evaporation. However, in applications where the apparatus 710 is in contact with high-sweat areas of the body (e.g. bottom of the foot), sweat may overtake (or fill) the entire open porosity, thus preventing or impeding air flow. According to one embodiment of the present invention, as shown in FIG. 10, the apparatus 710 may have two tiers 1010 and 1020 (which may be referred to as being "functionally graded") for use in high-sweat situations. As shown in FIG. 10, a micro-truss layer 1020 having smaller feature sizes can be formed on one surface of a thicker micro-truss layer 1010 with larger feature sizes (or a single, continuous open-cellular polymer that has at least two distinct, yet ordered 3D microstructures through its thickness). In this embodiment, the micro-truss layer with smaller feature sizes 1020 can wick sweat away from the body without clogging the natural air flow pathways within the larger micro-truss 1010 features. The size and spacing of the features of the micro-truss layer with smaller feature sizes 1020 can be chosen to promote wicking based on, for example, the surface tension, interfacial energy, and characteristics of the fluid being wicked (e.g., sweat) in accordance with the modified Young-Laplace equation discussed below. This multi-tiered approach can also be utilized when smaller, more closely spaced contact points are desired, e.g., for increased user comfort. A description of fabricating multi-tiered (or functionally graded) micro-truss structures can be found in U.S. patent application "Functionally-Graded Three-Dimensional Ordered Open-Cellular Microstructure and Method of Making Same" application Ser. No. 12/317,210 filed on Dec. 18, 2008, the entire disclosure of which is incorporated herein by reference.

Figure 11:
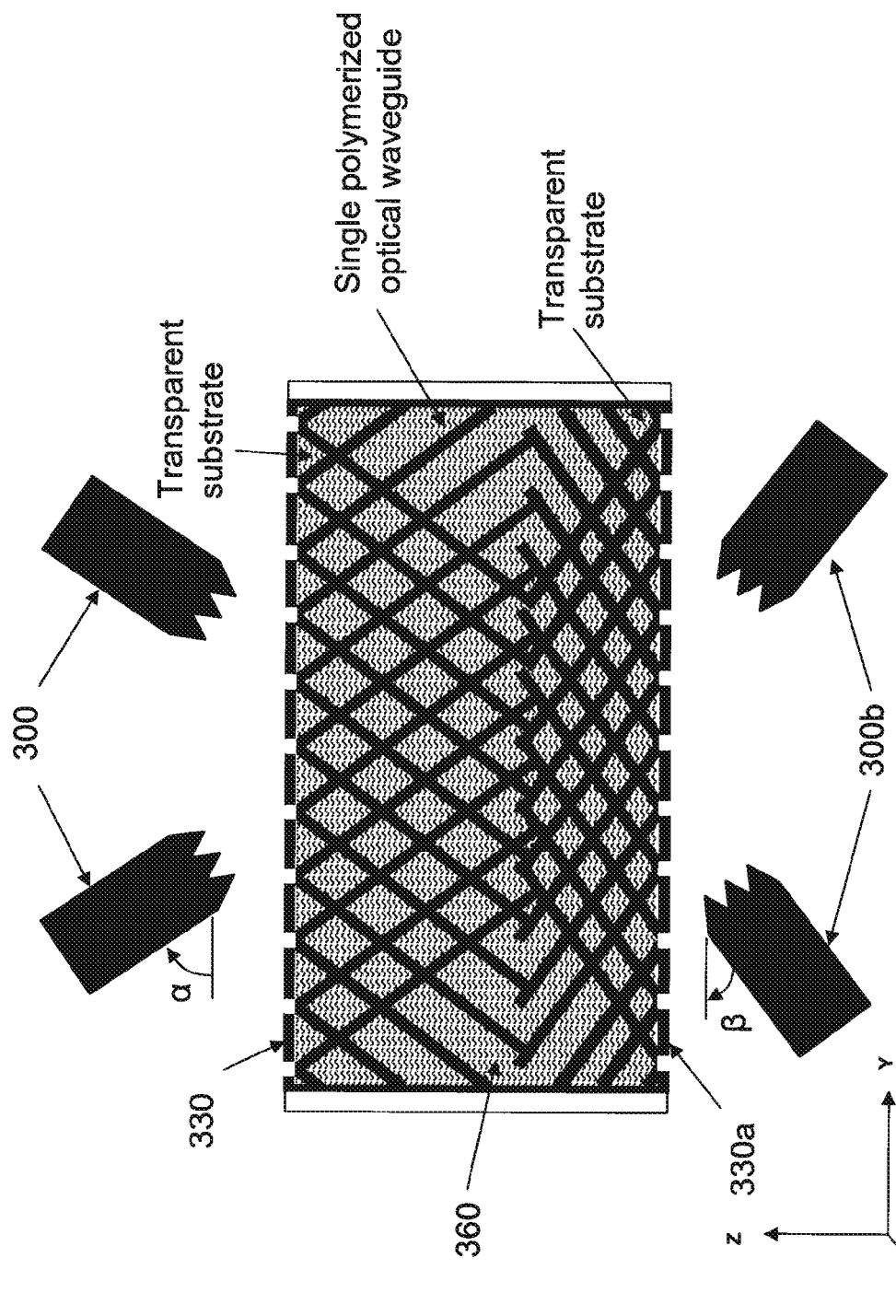
FIG. 11 is a schematic view of a system for forming a functionally graded 3D ordered micro-truss structure according to an embodiment of the present invention.

FIG. 11 shows a top view schematic of an example setup utilized to create the multi-tiered (or functionally graded) material with an ordered open-cellular 3D microstructure. In FIG. 11, the example setup contains a square mold and four collimated exposure beams (300 and 300b) each rotated 90° about the z-axis.

Figure 12A:
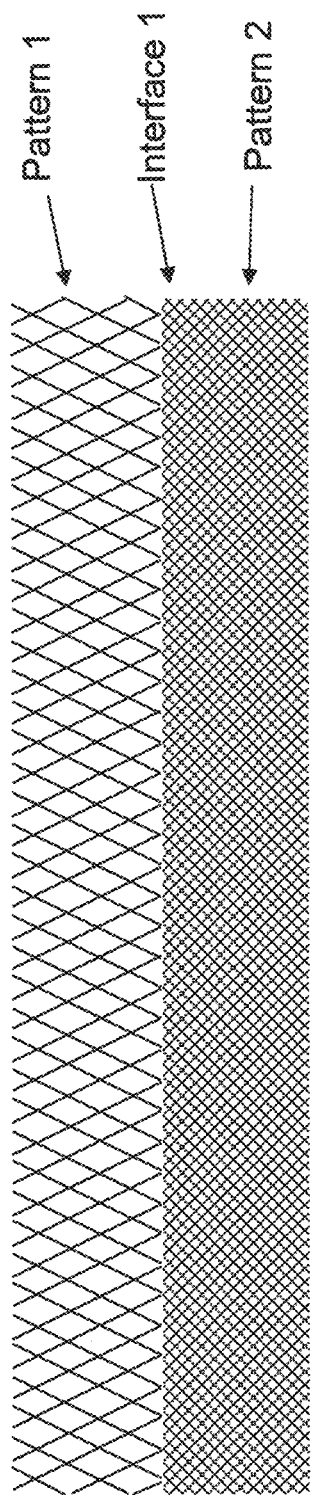
FIGS. 12a, 12b, and 12c are 2D schematic diagrams of three-dimensional functionally graded micro-truss structures according to embodiments of the present invention.
Figure 12B:
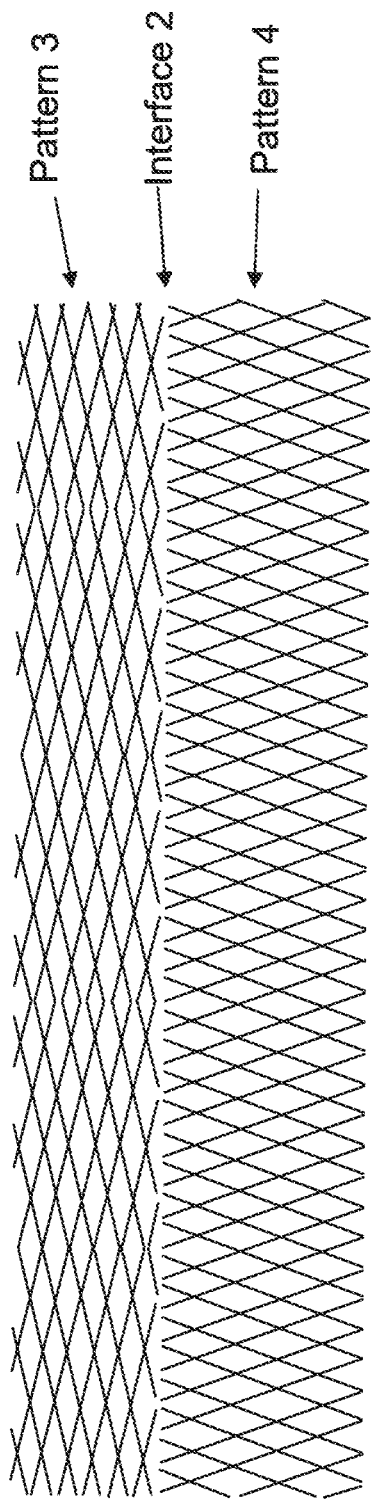
Figure 12C:
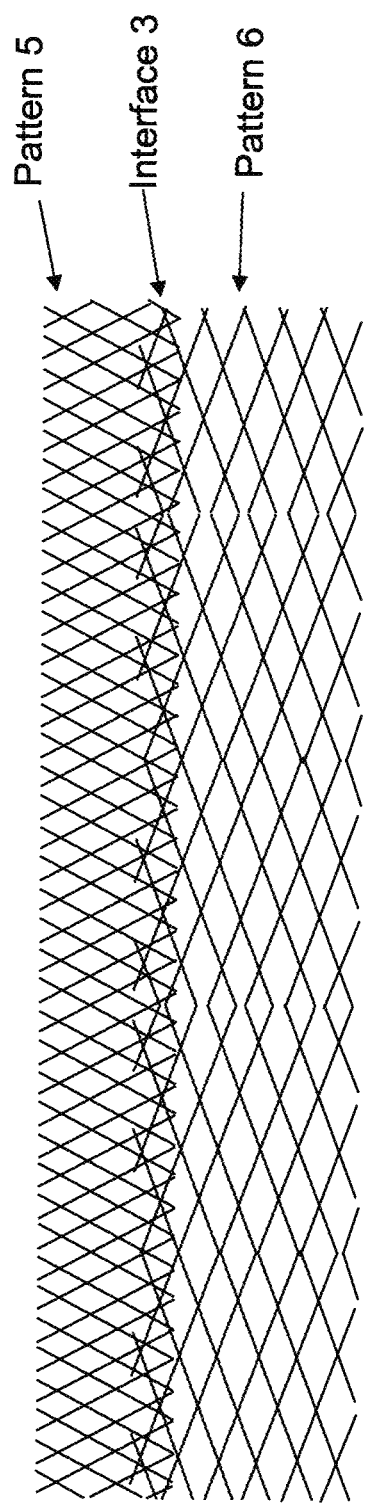

The open-cellular microstructure formed at each exposure surface will depend on the incident light angles as well as the mask pattern, so by suitably varying these light angles and/or the mask pattern, different microstructures can be formed. Since the waveguides (or struts) are initially formed at the exposure surface of the monomer and propagate away from this exposure surface, the exposure time and/or incident energy of the light can be suitably varied such that the two distinct microstructures formed at the two exposure surfaces will "connect," or intersect at some interface layer between the two exposure surfaces. This interface layer can have a thickness less than the unit cell thickness of either microstructure—i.e., just thick enough to form a physical connection between the two microstructures (as shown in FIGS. 12a and 12b)—or the two microstructures can overlap, creating an interface with its own distinct microstructure and thickness (as shown in FIG. 12c). That is, FIGS. 12a, 12b, and 12c represent 2D schematics of three-dimensional functionally graded microstructures that can be formed through the above described technique according to embodiments of the present invention.

Still referring to FIGS. 12*a*, 12*b*, and/or 12*c*, an embodiment of the present invention provides a functionally-graded three-dimensional ordered open-cellular microstructure. The functionally-graded three-dimensional ordered open-cellular microstructure includes a first three-dimensional interconnected pattern of polymer waveguides having a first three-dimensional pattern (Pattern 1, Pattern 3, Pattern 5); a second three-dimensional interconnected pattern of polymer waveguides having a second three-dimensional pattern differing from the first three-dimensional pattern (Pattern 2, Pattern 4, Pattern 6); and an interface (Interface 1, Interface 2, Interface 3) connected with the first three-dimensional interconnected pattern of polymer waveguides and the second three-dimensional interconnected pattern of polymer waveguides.

In one embodiment, the interface is a third three-dimensional interconnected pattern of polymer waveguides (Interface 3) having a third three-dimensional pattern differing from the first three-dimensional pattern and the second three-dimensional pattern.

In general, wicks may be used to transport, using capillary action, fluid from a point of generation to a suitable surface where the liquid can evaporate. Wicks may also redistribute the liquid to an area where heat or airflow is likely to enhance evaporation of the liquid. In some circumstances, achieving both of these functions involves wicks having different forms. The wicking properties of a micro-truss structure can be controlled (e.g., to enable lateral fluid wicking capability) by tailoring its architecture and surface chemistry to modify its mechanical strength and durability, surface area to volume ratio, and other properties.

The selection of the structure and chemical properties of the wick for a perspiration control layer depends on many factors, several of which are closely linked to the properties of the wicked fluid. For example, the maximum capillary head generated by a wick increases as pore size decreases. As another example, the wick permeability (the ease with which liquid moves within the wick), and hence the heat transport capability of the wick (when the wick is viewed as a heat pipe), increases as pore size increases. In addition, the overall thermal resistance at the evaporator side of the wick depends on the conductivity of the working fluid in the wick.

The thickness or surface-area to volume ratio of the wick may also be adjusted based on the requirements of the application. For example, a very thick wick is able to store and move a large quantity of fluid, but can become saturated if the rate of evaporation is smaller than the rate at which fluid is drawn into the wick. Thin wick structures, on the other hand, generally have a larger surface-area to volume ratio, which enables faster evaporation of the fluid in the wick, but may not be able to transmit fluid efficiently. Other properties of the wick to be considered when designing the wick are compatibility with the fluid and wettability.

Generally, the wicking material is designed to generate sufficient capillary pressure to drive the fluid from the point of generation to the point of evaporation. This pressure, $\Delta P$, is dependent on the solid-vapor ($\gamma_{SV}$) and solid-liquid ($\gamma_{SL}$) interfacial energies and pore radius, r (e.g., half the distance d between adjacent contact points as shown, for example, in FIGS. 7, 9, and 10), through a modified Young-Laplace equation: $\Delta P = 2(\gamma_{SV} - \gamma_{SL})/r$. Thus, capillary pressure increases as the wick pore radius (r), and the interfacial energy ($\gamma_{SL}$) decrease. However, too small a pore size will lead to increased fluid viscosity, which will reduce the volumetric flow rate (when under a pressure gradient).

In embodiments of the present invention, the apparatus 710 (as shown, for example, in FIG. 7) is designed to provide various amounts of support (e.g., compression modulus or compliance). The compressive properties are a function of the solid material properties that comprise the micro-truss and the unit cell geometric parameters (e.g., strut/truss member diameter, node-to-node spacing, etc.). The micro-truss perspiration control layer 10 can be designed to be very rigid and transmit load to the structure comprising the article of interest 740, or it can be designed to be compliant (e.g., soft) and to partially collapse in response to an applied compressive load that may be expected for a given application. In some embodiments, the apparatus 710 would be designed to maintain at least some open cells (e.g., not completely collapse) during normal use, such that at least some air can flow through the apparatus 710. The compressive properties can also be tailored to attenuate shock loads that may arise during use, thus providing an additional level of comfort and protection.

Figure 13:
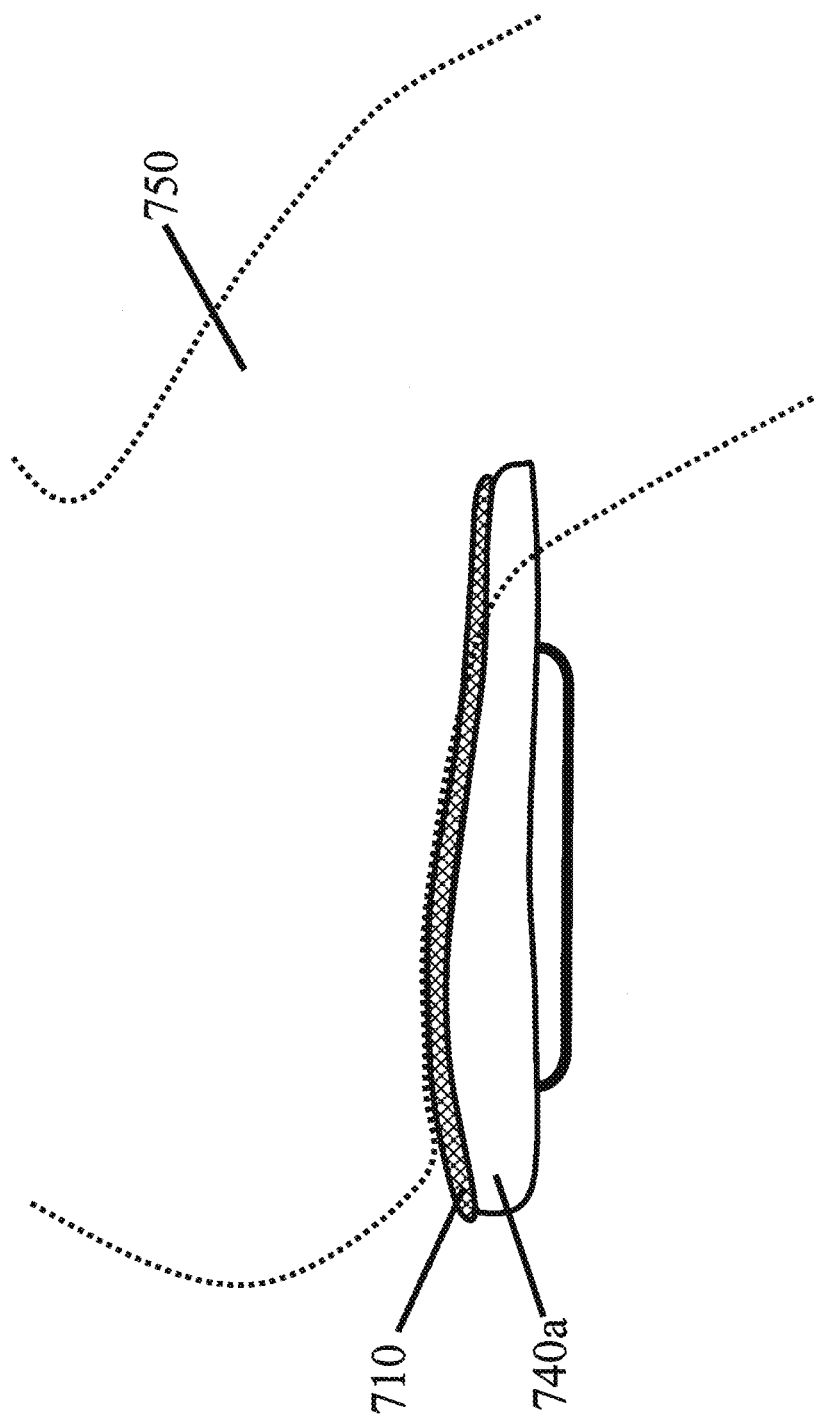
FIG. 13 is a schematic diagram illustrating the use of a micro-truss perspiration control layer with a seat according to one embodiment of the present invention.
Figure 14:
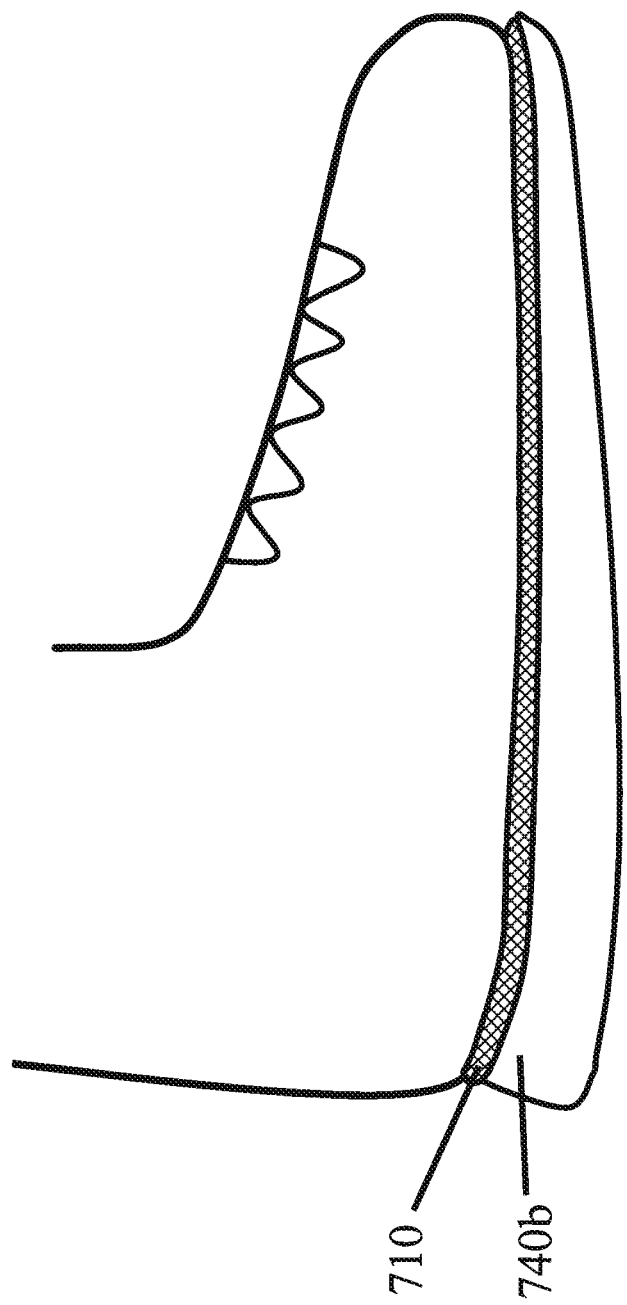
FIG. 14 is a schematic diagram illustrating the use of a micro-truss perspiration control layer with a shoe (e.g., as an insole of a shoe) according to one embodiment of the present invention.
Figure 15:
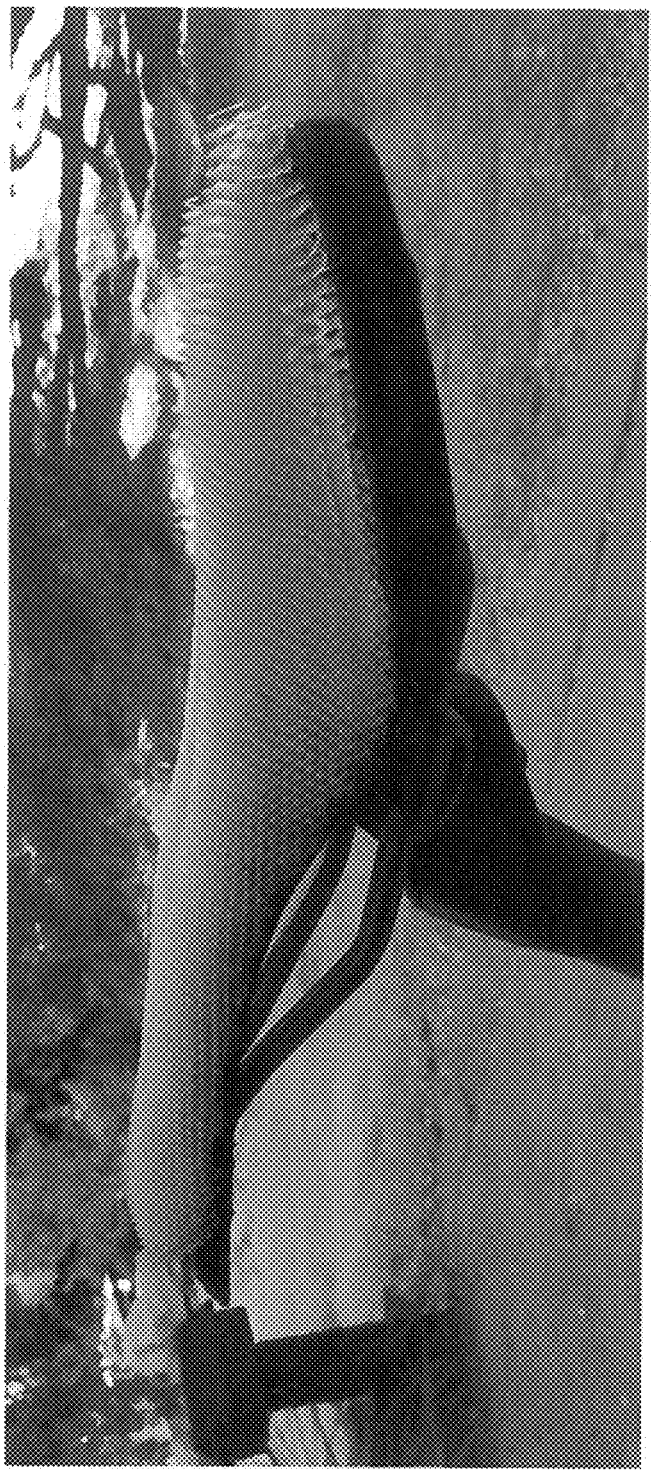
FIG. 15 is a photograph illustrating the use of a micro-truss perspiration control layer on a bicycle seat according to one embodiment of the present invention.

Two embodiments that may benefit from a micro-truss perspiration control layer include a bicycle seat 740*a* and a shoe insole 740*b*. Schematic diagrams illustrating such applications are shown in FIGS. 13 and 14, respectively. FIG. 15 is a photograph of a micro-truss based perspiration control layer constructed and applied to a bicycle seat.

In some embodiments of the present invention, a covering made of a smooth and porous material such as a cloth of Spandex® or Gore-Tex® may be bonded to the top surfaces of the perspiration control layer at the point of contact with the body. The covering may be used to improve comfort for the user by decreasing friction between the perspiration control layer and the body. For example, a layer of spandex may be applied over the micro-truss perspiration control layer when used on a bicycle seat, where the covering provides a smooth contact surface for the rider.

In some embodiments of the present invention, the struts of the micro-truss perspiration control layer are coated with a suitable anti-microbial composition such as nanosilver particles. In some embodiments, an anti-microbial layer is disposed over the entire perspiration control layer (e.g., in a layer of cloth bonded over a surface of the perspiration control layer).

Articles with which embodiments of the present invention may be used with include, but are not limited to: a helmet, an arm rest, a seat (e.g., a bicycle seat, a seat of a car or other vehicle, an office chair, outdoor patio chairs, and a seat cushion), padded clothing, a headband, a glove, a shoe insole, eyeglass frames, undergarments, a mattress, and a mattress topper.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. An apparatus for maintaining an environmental state of a working surface comprising:
    a first micro-truss layer comprising:
        a plurality of first struts extending along a first direction;
        a plurality of second struts extending along a second direction; and
        a plurality of third struts extending along a third direction, the first, second, and third struts interpenetrating one another at a plurality of nodes, the first, second, and third struts interpenetrating one another at non-perpendicular angles, the apparatus having a contact surface configured to contact the working surface and having an open porosity configured to allow air to flow to the contact surface, wherein a total surface area of the contact surface is between about 1% and about 50% of a total surface area of the working surface.

2. The apparatus of claim 1, wherein the first, second, and third struts form a first plurality of unit cells.

3. The apparatus of claim 2, wherein the apparatus is less than five unit cells thick in a direction perpendicular to the contact surface.

4. The apparatus of claim 2, wherein the unit cells are about the same size.

5. The apparatus of claim 1, wherein a ratio of the total surface area of the first micro-truss layer at the contact surface to the total surface area of the contact surface is maintained to be substantially constant when the apparatus is under up to 50% densification strain.

6. The apparatus of claim 1, wherein the contact surface comprises a plurality of contact points spaced apart from one another, each of the contact points having a contact area in the range from about 100 square microns to about 10 square millimeters.

7. The apparatus of claim 1, further comprising a second micro-truss layer comprising:
a plurality of fourth struts extending along a fourth direction;
a plurality of fifth struts extending along a fifth direction; and
a plurality of sixth struts extending along a sixth direction, the second micro-truss layer being located between the first micro-truss layer and the contact surface.

8. The apparatus of claim 7, wherein the fourth, fifth, and sixth struts form a second plurality of unit cells and the first, second, and third struts form a first plurality of unit cells, each of the first unit cells being larger than each of the second unit cells.

9. The apparatus of claim 7, wherein the first, second, and third struts form a first three-dimensional pattern and the fourth, fifth, and sixth struts form a second three-dimensional pattern, the second three-dimensional pattern differing from the first three-dimensional pattern.

10. The apparatus of claim 9, further comprising an interface connected with the first three-dimensional pattern and the second three-dimensional pattern.

11. The apparatus of claim 9, wherein the first and second three-dimensional patterns have order in three dimensions.

12. The apparatus of claim 1, further comprising a plurality of fourth struts extending in a direction perpendicular to the contact surface.

13. The apparatus of claim 1, wherein the apparatus is configured to be used with an article wearable by a person.

14. A method of providing airflow to a working surface, the method comprising:
configuring a first micro-truss layer to have an open porosity to allow air to flow through the first micro-truss layer, the first micro-truss layer comprising:
a plurality of first struts extending along a first direction;
a plurality of second struts extending along a second direction; and
a plurality of third struts extending along a third direction,
the first, second, and third struts interpenetrating one another at a plurality of nodes, the first, second, and third struts interpenetrating one another at non-perpendicular angles; and configuring the first micro-truss layer to be applied to the working surface, the first micro-truss layer being configured to contact the working surface at a contact surface, a total surface area of the micro-truss layer at the contact surface being between about 1% and about 50% of a total surface area of the working surface.

15. The method of claim 14, wherein the first, second, and third struts are configured to form a first plurality of unit cells.

16. The method of claim 15, wherein the micro-truss layer is less than five unit cells thick in a direction perpendicular to the contact surface.

17. The method of claim 15, wherein the unit cells are about the same size.

18. The method of claim 14, wherein the contact surface comprises a plurality of contact points spaced apart from one another, each of the contact points having a contact area in the range from about 100 square microns to about 10 square millimeters.

19. The method of claim 14, wherein a ratio of the total surface area of the contact surface to the total surface area of the working surface is maintained to be substantially constant when the first micro-truss layer is under up to 50% densification strain.

20. The method of claim 14, wherein the first micro-truss layer further comprises a plurality of fourth struts extending in a direction perpendicular to the contact surface.

21. The method of claim 14, wherein the first micro-truss layer is a portion of: a helmet, an arm rest, a seat, a piece of clothing, a headband, a glove, a shoe insole, eyeglass frames, an undergarment, a mattress, or a mattress topper.

22. A method of providing airflow to a working surface, the method comprising:
configuring a first micro-truss layer to have an open porosity to allow air to flow through the first micro-truss layer, the first micro-truss layer comprising:
a plurality of first struts extending along a first direction,
a plurality of second struts extending along a second direction, and
a plurality of third struts extending along a third direction,
the first, second, and third struts interpenetrating one another at a plurality of nodes, the first, second, and third struts interpenetrating one another at non-perpendicular angles;
configuring a second micro-truss layer to have an open porosity for wicking moisture through the second micro-truss layer, the second micro-truss layer comprising:
a plurality of fourth struts extending along a fourth direction,
a plurality of fifth struts extending along a fifth direction, and
a plurality of sixth struts extending along a sixth direction;
configuring the second micro-truss layer to be applied to the working surface, the second micro-truss layer being configured to contact the working surface at a contact surface, a total surface area of the micro-truss layer at the contact surface being between about 1% and about 50% of a total surface area of the working surface; and
attaching the second micro-truss layer to the first micro-truss layer, between the first micro-truss layer and the contact surface.

23. The method of claim 22, wherein the fourth, fifth, and sixth struts form a second plurality of unit cells and the first, second, and third struts form a first plurality of unit cells, each of the first unit cells being larger than each of the second unit cells.

* * * * *